US007573505B2

(12) United States Patent
Kawaguchi et al.

(10) Patent No.: US 7,573,505 B2
(45) Date of Patent: Aug. 11, 2009

(54) IMAGE CAPTURING APPARATUS, CONTROL METHOD THEREFOR, PROGRAM, AND STORAGE MEDIUM

(75) Inventors: Zenya Kawaguchi, Tokyo (JP); Yoshihiro Kobayashi, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 667 days.

(21) Appl. No.: 11/095,888

(22) Filed: Mar. 31, 2005

(65) Prior Publication Data
US 2005/0231628 A1    Oct. 20, 2005

(30) Foreign Application Priority Data

Apr. 1, 2004 (JP) .............................. 2004-109071
Mar. 29, 2005 (JP) .............................. 2005-093874

(51) Int. Cl.
*H04N 5/228* (2006.01)
(52) U.S. Cl. .............. 348/222.1; 348/221.1; 348/223.1; 348/345
(58) Field of Classification Search ................. 348/345, 348/208.15, 223.1, 222.1; 382/118
See application file for complete search history.

(56) References Cited

U.S. PATENT DOCUMENTS

| 6,940,545 | B1 * | 9/2005 | Ray et al. ................. 348/222.1 |
| 6,975,759 | B2 * | 12/2005 | Lin ............................. 382/167 |
| 7,071,985 | B1 * | 7/2006 | Onoda et al. ................. 348/349 |
| 7,298,412 | B2 * | 11/2007 | Sannoh et al. ............... 348/348 |
| 2006/0012702 | A1 * | 1/2006 | Kawahara et al. ........... 348/345 |
| 2006/0028576 | A1 * | 2/2006 | Ito ............................... 348/345 |

FOREIGN PATENT DOCUMENTS

| JP | 5-41830 | 2/1993 |
| JP | 9-251534 | 9/1997 |
| JP | 2001-119622 | 4/2001 |
| JP | 2003-107335 | 4/2003 |
| JP | 2003-107555 | 4/2003 |
| JP | 2003107335 A * | 4/2003 |

OTHER PUBLICATIONS

Matthew A. Turk and Alex P. Pentland, "Face Recognition Using Eigenfaces", Proc. Of IEEE Conf. on Computer Vision and Pattern Recognition, pp. 586-591, 1991.

* cited by examiner

*Primary Examiner*—Jason Chan
*Assistant Examiner*—Gary C Vieaux
(74) *Attorney, Agent, or Firm*—Cowan, Liebowitz & Latman, P.C.

(57) ABSTRACT

An image capturing apparatus having an auto focus function or an auto exposure function stores digital image data output from an A/D conversion unit as first image data directly or after performing predetermined processing, and stores the digital image data serving as a base of the first image data as second image data after performing predetermined processing for the digital image data. The apparatus then detects a face region from the second image data, and displays the image on the basis of the image data output from the A/D conversion unit while the face region is detected form the second image data. After completion of detection of the face region from the second image data, the apparatus extracts information for auto focus, auto exposure, or white balance by using, of the first image data, data at a portion corresponding to the face region that is detected by said face detection means, and performs auto focus control, auto exposure control, or white balance control.

2 Claims, 16 Drawing Sheets

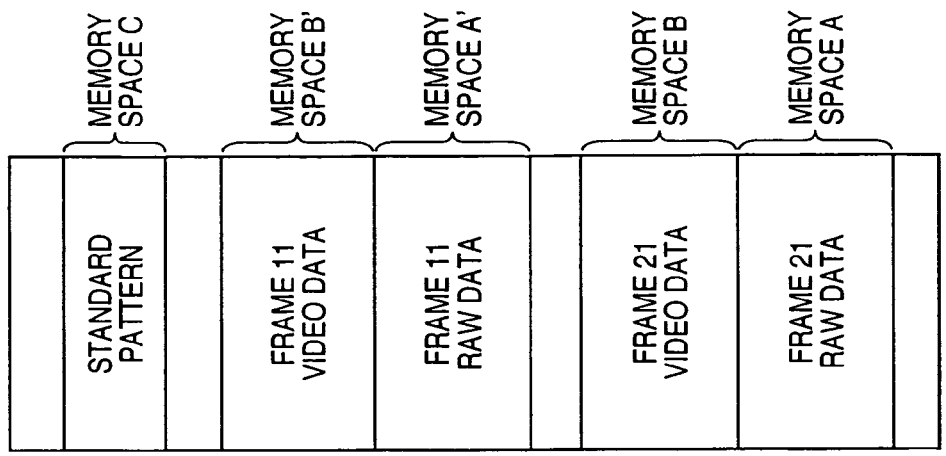
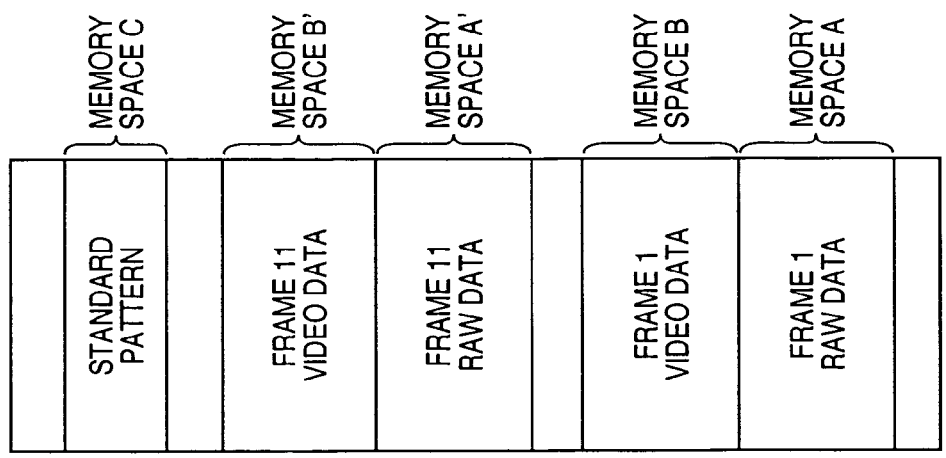
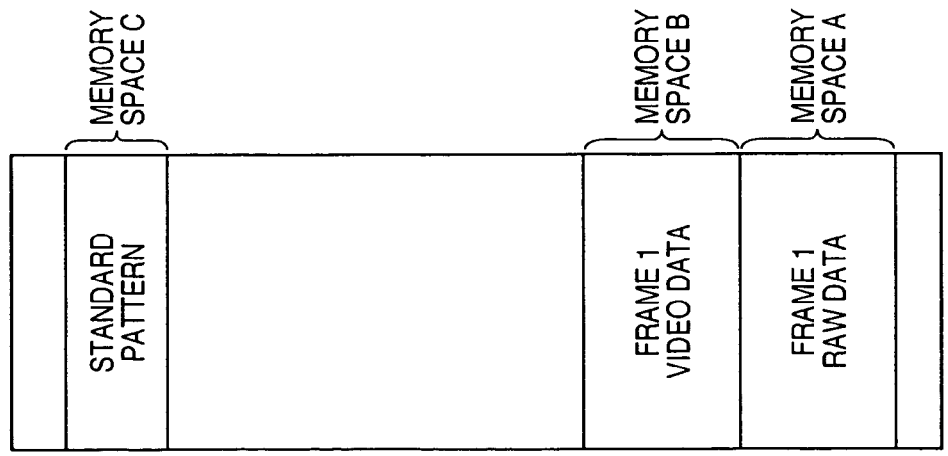

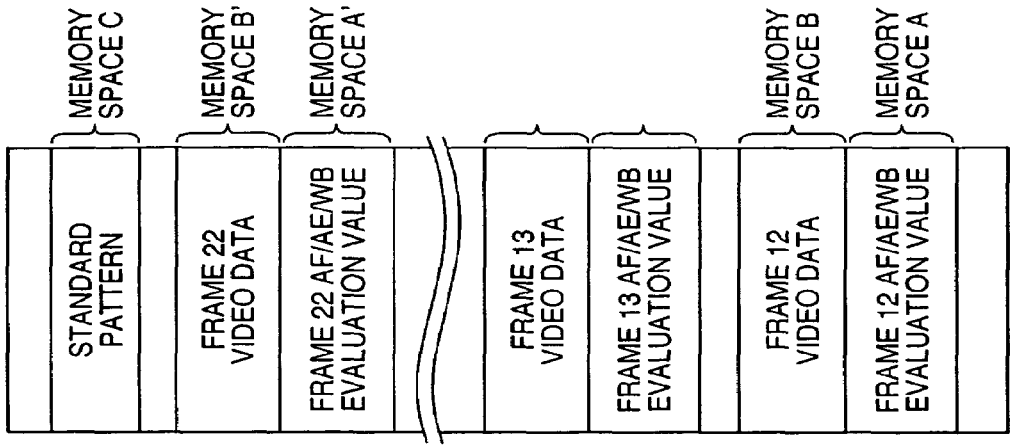
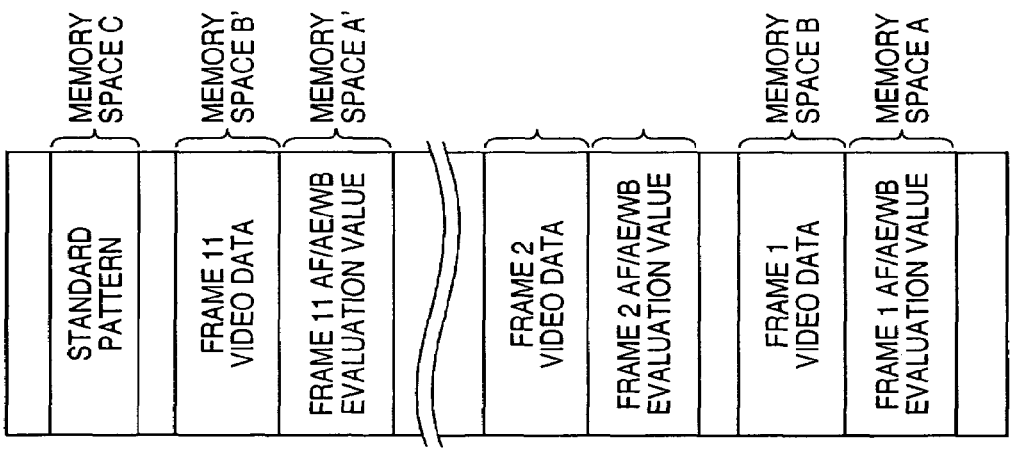
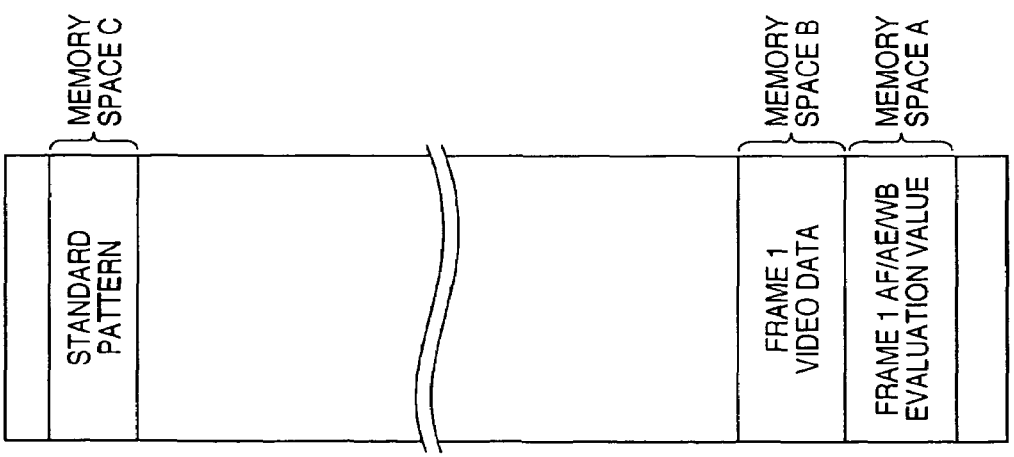

IMAGE CAPTURING APPARATUS, CONTROL METHOD THEREFOR, PROGRAM, AND STORAGE MEDIUM

FIELD OF THE INVENTION

The present invention relates to a technique of detecting the position of a man's face serving as a main object from an input image and adjusting the focus and exposure to the detected position.

BACKGROUND OF THE INVENTION

When a man is to shot with an image capturing apparatus such as a digital still camera, the image capturing apparatus must be focused to the man's face serving as a main object, and the image of the man's face serving as a main object must be captured at an optimal exposure. In conventional AF/AE (Auto Focus/Auto Exposure) control, a predetermined area in the frame is defined as a distance measuring/photometry area, and the focus and exposure are adjusted to the distance measuring/photometry area. If the man's face serving as a main object falls outside the distance measuring/photometry area, the focus and exposure do not match the man's face.

For example, when the center of the frame is set as a distance measuring/photometry area, and an image is captured with a composition in which two mans exist side by side, as shown in FIG. 5A, or a composition in which a man shifts to right within the frame, as shown in FIG. 5B, the focus and exposure are adjusted to the background of the man. In FIGS. 5A and 5B, a broken frame is a distance measuring/photometry area. To prevent this, there are proposed many control methods of detecting the position of a man's face from a captured image, extracting an AF/AE evaluation value from the detected region, and adjusting the focus and exposure (see, e.g., Japanese Patent Laid-Open Nos. 05-041830, 2001-119622, 2003-107335, and 2003-107555).

In Japanese Patent Laid-Open No. 05-041830, a skin tone is obtained from a captured image, and if the skin tone is determined to be a man's face, the exposure is so controlled as to set the average luminance signal level to a desired value in the skin tone of a subsequently captured image. That is, a captured image for detecting the position of a man's face and a captured image for detecting an evaluation value used for exposure control are different.

Japanese Patent Laid-Open Nos. 2001-119622 and 2003-107335 disclose a control method of adjusting the exposure to a man's face in a captured image, and Japanese Patent Laid-Open No. 2003-107555 discloses a control method of adjusting the focus to a man's face in a captured image. However, these references do not describe whether a captured image for detecting the position of a man's face and a captured image for detecting an AF/AE evaluation value are the same.

However, a certain time is required to detect the position of the man's face. Even when the position of the man's face is detected from the captured image to set a distance measuring/photometry area, and an AF/AE evaluation value is detected from a subsequently captured image, the man's face falls outside the distance measuring/photometry area, and the focus and exposure fail to match the man's face, if the man moves or camera shake of the image capturing apparatus occurs.

For example, a case in which a man who moves from left to right within the frame is shot to successively capture images of two frames, as shown in FIGS. 6A and 6B will be explained. For example, FIG. 6B shows an image captured when 1 sec has elapsed from the timing shown in FIG. 6A.

The results of detecting the position of a man's face from images in FIGS. 6A and 6B are x and y regions surrounded by dotted lines. The x region determined from the image of FIG. 6A to be the position of the man's face is set as a distance measuring/photometry area, and an AF/AE evaluation value is detected from the subsequently captured image of FIG. 6B. In FIG. 6B, the position of the man's face moves to the y region. If AF/AE control is performed on the basis of the AF/AE evaluation value detected from the x region, the focus and exposure are adjusted to an object which exists on the background in the x region and is irrelevant to the man.

SUMMARY OF THE INVENTION

The present invention has been made in consideration of the above situation, and has as its object to provide an image capturing apparatus which can execute detection of an AF/AE/WB evaluation value for an image of a frame serving as a face region detection target, thereby performing focus adjustment and exposure control to the man's face at a higher precision than the conventional one, and is resistant to movement of a man and camera shake.

To solve the above-described problems and achieve the above object, according to the first aspect of the present invention, an image capturing apparatus comprising: image sensing means for photoelectrically converting an object image formed by an imaging optical system, and outputting an image signal; A/D conversion means for digitizing the image signal output from the image sensing means, and outputting digital image data; first storage means for storing the digital image data output from the A/D conversion means, as first image data; second storage means for storing the digital image data serving as a base of the first image data, as second image data different from the first image data; face detection means for detecting a face region from the second image data; display means for displaying an image on the basis of the image data output from the A/D conversion means while the face detection means detects the face region from the second image data; extraction means for extracting, when the face detection means completely detects the face region from the second image data, at least one of pieces of information for auto focus, auto exposure, and white balance by using, of the first image data, data at a portion corresponding to the face region detected by the face detection means; and control means for performing at least one of auto focus control, auto exposure control, and white balance control on the basis of the information extracted by the extraction means.

According to the second aspect of the present invention, an image capturing apparatus comprising: image sensing means for photoelectrically converting an object image formed by an imaging optical system, and outputting an image signal; A/D conversion means for digitizing the image signal output from the image sensing means, and outputting digital image data; extraction means for extracting at least one of pieces of information for auto focus, auto exposure, and white balance by using the digital image data output from the A/D conversion means; first storage means for storing the information extracted by the extraction means, as first image data; second storage means for storing the digital image data serving as a base of the first image data, as second image data different from the first image data; face detection means for detecting a face region from the second image data; display means for displaying an image on the basis of the image data output from the A/D conversion means while the face detection means detects the face region from the second image data; and control means for performing, when the face detection means completely detects the face region from the second image data, at least one of auto focus control, auto exposure control, and white balance control on the basis of, of the first image data, data at a portion corresponding to the face region detected by the face detection means.

According to the third aspect of the present invention, an image capturing apparatus comprising: image sensing means for photoelectrically converting an object image formed by an imaging optical system, and outputting an image signal; A/D conversion means for digitizing the image signal output from the image sensing means, and outputting digital image data; first storage means for sequentially storing the digital image data output from the A/D conversion means, as first image data; second storage means for sequentially storing the digital image data serving as bases of the first image data, as second image data different from the first image data; face detection means for detecting face regions from the second image data; extraction means for extracting at least one of pieces of information for auto focus, auto exposure, and white balance by using the first image data generated from the same image data as any one of second image data whose similarities to the image data used for detecting the face region fall within a predetermined value, of the second image data obtained while the face detection means detects the face region; and control means for performing at least one of auto focus control, auto exposure control, and white balance control on the basis of the information extracted by the extraction means.

According to the fourth aspect of the present invention, an image capturing apparatus comprising: image sensing means for photoelectrically converting an object image formed by an imaging optical system, and outputting an image signal; A/D conversion means for digitizing the image signal output from the image sensing means, and outputting digital image data; first storage means for sequentially storing the digital image data output from the A/D conversion means, as first image data; second storage means for sequentially storing the digital image data serving as bases of the first image data, as second image data different from the first image data; face detection means for detecting face regions from the second image data; and control means for performing at least one of auto focus control, auto exposure control, and white balance control independent of a result of detecting a face, when another second image data is absent whose similarity to the second image data used for detecting the face region falls within a predetermined value, of the second image data obtained while the face detection means detects the face region.

According to the fifth aspect of the present invention, an image capturing apparatus comprising: image sensing means for photoelectrically converting an object image formed by an imaging optical system, and outputting an image signal; A/D conversion means for digitizing the image signal output from the image sensing means, and outputting digital image data; extraction means for extracting at least one of pieces of information for auto focus, auto exposure, and white balance by using the digital image data output from the A/D conversion means; first storage means for sequentially storing the information extracted by the extraction means, as first image data; second storage means for sequentially storing the digital image data serving as bases of the first image data, as second image data different from the first image data; face detection means for detecting a face region from the second image data; control means for performing at least one of auto focus control, auto exposure control, and white balance control on the basis of data at a portion corresponding to the face region detected by the face detection means, of the first image data generated from the same image data as any one of second image data whose similarities to the image data used for detecting the face region fall within a predetermined value, of the second image data obtained while the face detection means detects the face region.

According to the sixth aspect of the present invention, an image capturing apparatus comprising: image sensing means for photoelectrically converting an object image formed by an imaging optical system, and outputting an image signal; A/D conversion means for digitizing the image signal output from the image sensing means, and outputting digital image data; extraction means for extracting at least one of pieces of information for auto focus, auto exposure, and white balance by using the digital image data output from the A/D conversion means; first storage means for sequentially storing the information extracted by the A/D conversion means, as first image data; second storage means for sequentially storing the digital image data serving as bases of the first image data, as second image data different from the first image data; face detection means for detecting face regions from the second image data; and control means for performing at least one of auto focus control, auto exposure control, and white balance control independent of a result of detecting a face, when another second image data is absent whose similarity to the second image data used for detecting the face region falls within a predetermined value, of the second image data obtained while the face detection means detects the face region.

According to the seventh aspect of the present invention, an image capturing apparatus control method comprising: an image sensing step of photoelectrically converting an object image formed by an imaging optical system, and outputting an image signal; an A/D conversion step of digitizing the image signal output in the image sensing step, and outputting digital image data; a first storage step of storing the digital image data output in the A/D conversion step, as first image data; a second storage step of storing the digital image data serving as a base of the first image data, as second image data different from the first image data; a face detection step of detecting a face region from the second image data; a display step of displaying an image on the basis of the image data output in the A/D conversion step while the face region is detected from the second image data in the face detection step; an extraction step of extracting, when the face region is completely detected from the second image data in the face detection step, pieces of information for auto focus, auto exposure, and white balance by using, of the first image data, data at a portion corresponding to the face region detected in the face detection step; and a control step of performing at least one of auto focus control, auto exposure control, and white balance control on the basis of the information extracted in the extraction step.

According to the eighth aspect of the present invention, an image capturing apparatus control method comprising: an image sensing step of photoelectrically converting an object image formed by an imaging optical system, and outputting an image signal; an A/D conversion step of digitizing the image signal output in the image sensing step, and outputting digital image data; a first storage step of sequentially storing the digital image data output in the A/D conversion step, as first image data; a second storage means for sequentially storing the digital image data serving as bases of the first image data, as second image data different from the first image data; a face detection step of detecting face regions from the second image data; an extraction step of extracting at least one of pieces of information for auto focus, auto exposure, and white balance by using the first image data generated from the same image data as any one of second image data whose similarities to the image data used for detecting the face region fall within a predetermined value, of the second image data obtained while the face region is detected in the face detection step; and a control step of performing at least one of auto focus control, auto exposure control, and white balance control on the basis of the information extracted in the extraction step.

According to the ninth aspect of the present invention, an image capturing apparatus control method comprising: an image sensing step of photoelectrically converting an object image formed by an imaging optical system, and outputting an image signal; an A/D conversion step of digitizing the image signal output in the image sensing step, and outputting digital image data; a first storage step of sequentially storing the digital image data output in the A/D conversion step, as first image data; a second storage step of sequentially storing the digital image data serving as bases of the first image data, as second image data different from the first image data; a face detection step of detecting face regions from the second image data; and a control step of performing at least one of auto focus control, auto exposure control, and white balance control independent of a result of detecting a face, when another second image data is absent whose similarity to the second image data used for detecting the face region falls within a predetermined value, of the second image data obtained while the face region is detected in the face detection step.

According to the 10th aspect of the present invention, an image capturing apparatus control method characterized by comprising: an image sensing step of photoelectrically converting an object image formed by an imaging optical system, and outputting an image signal; an A/D conversion step of digitizing the image signal output in the image sensing step, and outputting digital image data; an extraction step of extracting at least one of pieces of information for auto focus, auto exposure, and white balance by using the digital image data output in the A/D conversion step; a first storage step of sequentially storing the information extracted in the extraction step, as first image data; a second storage step of sequentially storing the digital image data serving as bases of the first image data, as second image data different from the first image data; a face detection step of detecting a face region from any one of the second image data; a control step of performing at least one of auto focus control, auto exposure control, and white balance control on the basis of data at a portion corresponding to the face region detected in the face detection step, of the first image data generated from the same image data as any one of second image data whose similarities to the image data used for detecting the face region fall within a predetermined value, of the second image data obtained while the face region is detected in the face detection step.

According to the 11th aspect of the present invention, an image capturing apparatus control method characterized by comprising: an image sensing step of photoelectrically converting an object image formed by an imaging optical system, and outputting an image signal; an A/D conversion step of digitizing the image signal output in the image sensing step, and outputting digital image data; an extraction step of extracting at least one of pieces of information for auto focus, auto exposure, and white balance by using the digital image data output in the A/D conversion step; a first storage step of sequentially storing the information extracted in the A/D conversion step, as first image data; a second storage step of sequentially storing the digital image data serving as bases of the first image data, as second image data different from the first image data; a face detection step of detecting face regions from the second image data; and a control step of performing at least one of auto focus control, auto exposure control, and white balance control independent of a result of detecting a face, when another second image data is absent whose similarities to the second image data used for detecting the face region fall within a predetermined value, of the second image data obtained while the face region is detected in the face detection step.

According to the 12th aspect of the present invention, a program characterized by causing a computer to execute a control method defined above.

According to the 13th aspect of the present invention, a storage medium characterized by computer-readably storing a program defined above.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIGS. 4A, 4B, and 4C are views showing the memory space of a memory according to the first embodiment of the present invention;

FIGS. 16A, 16B, and 16C are views showing the memory space of a memory according to the fourth embodiment of the present invention.

DETAILED DESCRIPTION OF THE PREFERRED EMBODIMENTS

Preferred embodiments of the present invention will be described in detail below with reference to the accompanying drawings.

First Embodiment

Figure 1:
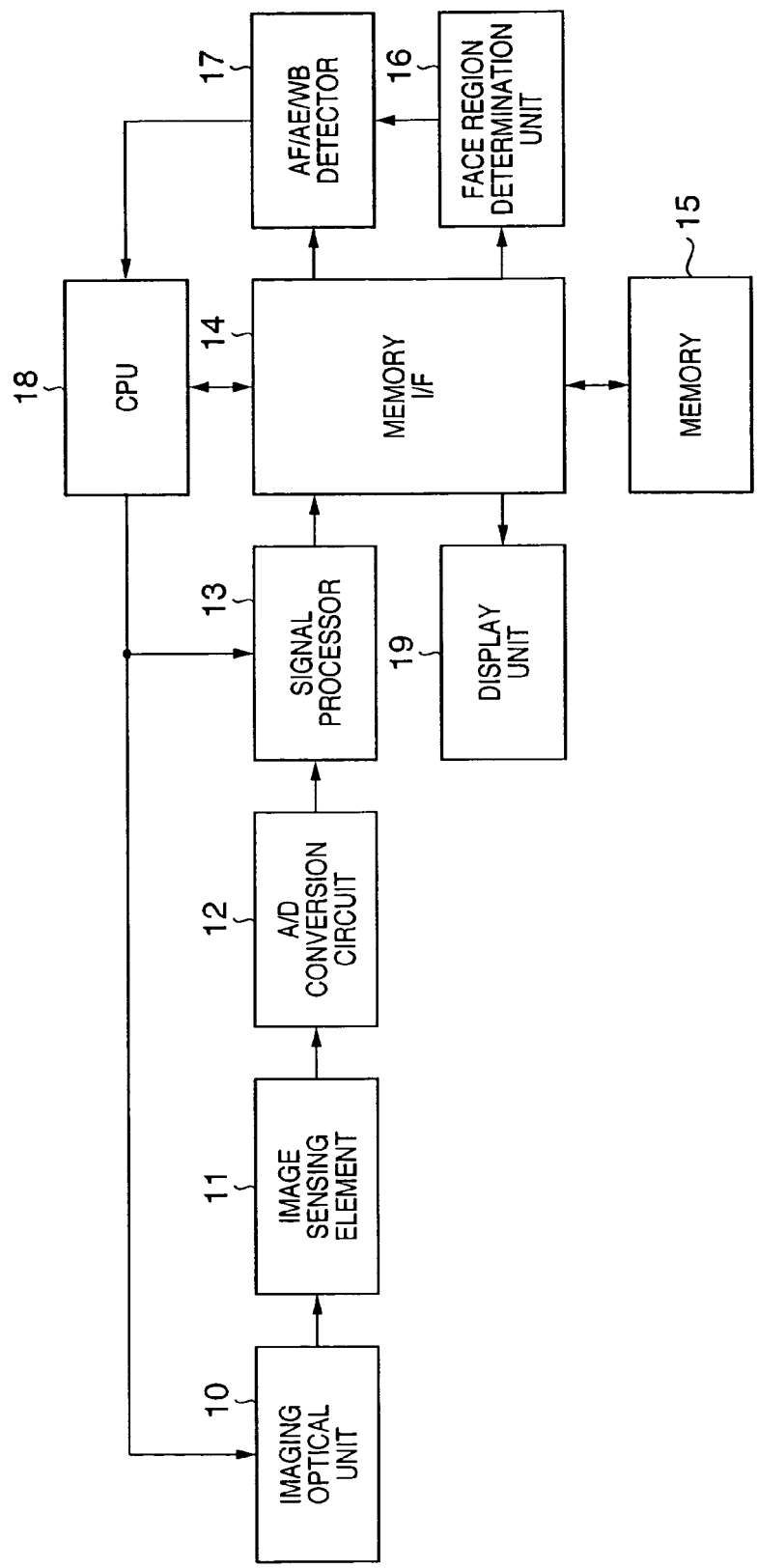
FIG. 1 is a functional block diagram showing an image capturing apparatus according to the first embodiment of the present invention.

FIG. 1 is a functional block diagram showing an image capturing apparatus according to the first embodiment of the present invention.

In FIG. 1, reference numeral 10 denotes an imaging optical unit which is formed from a lens, stop, and the like, and performs focus adjustment and exposure adjustment; 11, an image sensing element such as a CCD which converts an optical image into an electrical signal; 12, an A/D conversion circuit which converts an analog image signal from the image sensing element 11 into digital image data; 13, a signal processor which performs gamma processing, interpolation processing, matrix conversion, and the like for image data output from the A/D conversion circuit 12, and creates video data; 14, a memory I/F which executes write/read of video data and various control data with a memory (DRAM) 15; 16, a face region determination unit which determines the region of a man's face from video data; 17, an AF/AE/WB (Auto Focus/Auto Exposure/White Balance) detector which detects an AF/AE/WB evaluation value; 18, a CPU which manages various control operations, controls the imaging optical unit on the basis of an evaluation value from the AF/AE/WB detector 17, and sets the parameters of signal processing in the signal processor 13; and 19, a display unit which includes a liquid crystal monitor or the like for displaying, as needed, the video data created by the signal processor 13, and causing a user to observe the details of an object in real time.

Figure 2:
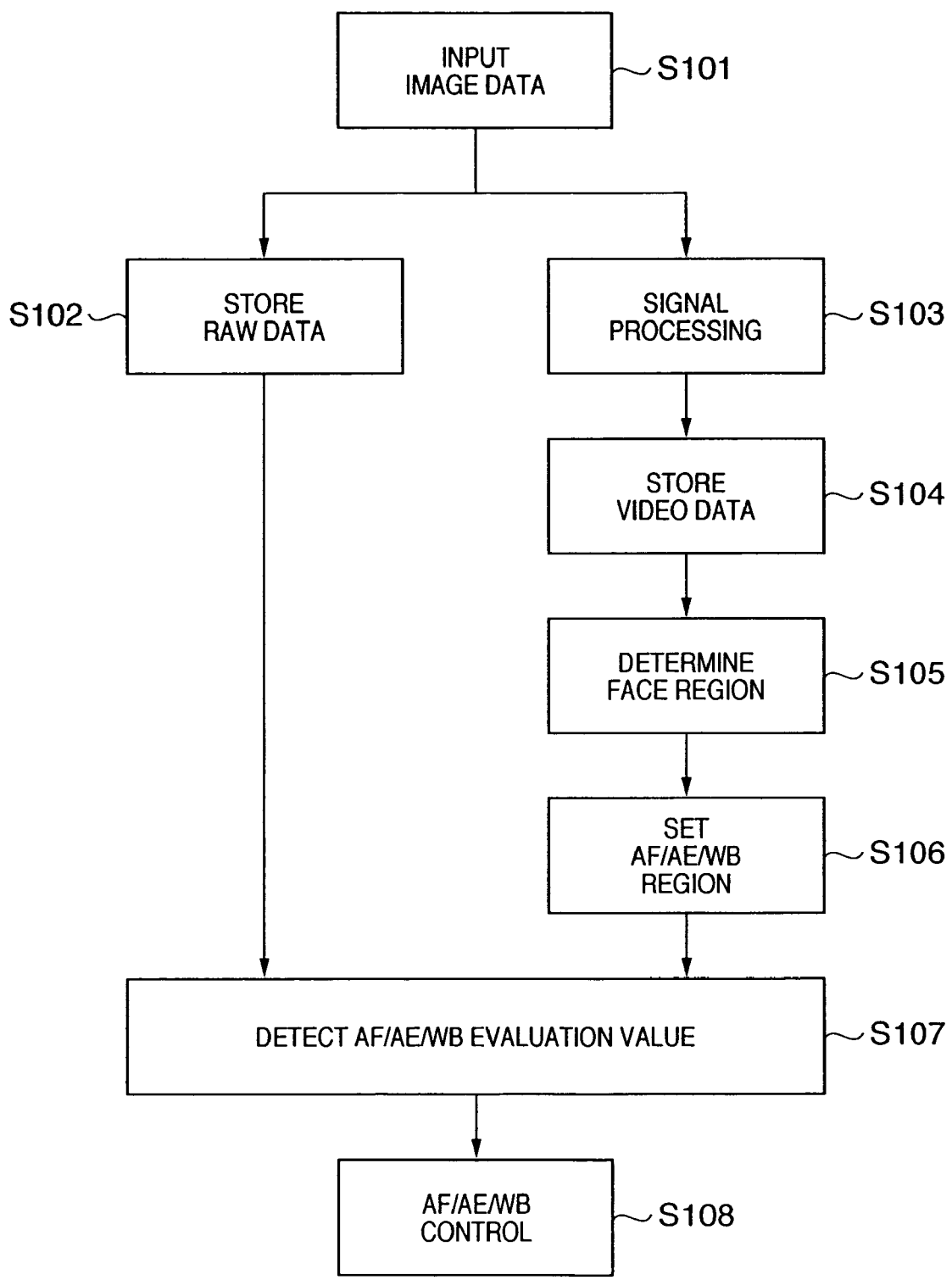
FIG. 2 is a flowchart showing processing according to the first embodiment of the present invention.

The operation of the image capturing apparatus according to the first embodiment of the present invention will be explained with reference to the flowchart shown in FIG. 2.

A digital still camera monitors an image to be captured on the display unit 19 before image capturing. In the first embodiment, the position of a man's face and an AF/AE/WB evaluation value are extracted during monitoring.

In step S101, upon setting a face detection mode for detecting a face for the monitored image, light incident on the imaging optical unit 10 is formed into an image on the light-receiving surface of the image sensing element 11, and output as an analog image signal from the image sensing element 11. The analog image signal is converted into digital image data by the A/D conversion circuit 12, and the digital image data is input to the signal processor 13. Note that, in this case, the signal input is started to the signal processor 13 by setting the face detection mode. However, the signal input may be started to the signal processor 13 by pressing a release button halfway (SW1).

The signal processor 13 parallel-executes two processes in steps S102 and S103. In step S102, input image data is stored directly (as data compressed by a RAW compression scheme) in a predetermined memory space (memory space A) of the memory 15 via the memory I/F 14. In step S103, input image data undergoes gamma processing, interpolation processing, matrix conversion, and the like to create video data.

In step S104, the CPU 18 stores the video data created in step S103 via the memory I/F 14 in a predetermined memory space (memory space B) of the memory 15 that is different from the memory space A. The image data stored in step S102 and the video data created in the step S103 are based on the same image data output from the A/D conversion circuit 12.

In step S105, the face region determination unit 16 detects the region of a man's face by using the video data of the first frame obtained after setting the face detection mode, which is stored in the memory space B in step S104. The capacity of the video data stored in the memory space B is smaller than that of the image data stored in the memory space A. Hence, detection of the face region from the video data in the memory space B can be completed within a shorter time than that from the image data in the memory space A.

As a method of detecting the region of a man's face, a method using an eigenface by the analysis of a main component (M. A. Turk and A. P. Pentland, "Face recognition using eigenfaces", Proc. of IEEE Conf. on Computer Vision and Pattern Recognition, pp. 586-591, 1991.), and a method utilizing a feature point such as an eye, nose, or mouth (in Japanese Patent Laid-Open No. 09-251534) are proposed and applicable. According to these methods, whether an input image is an image of a man's face is determined by pattern matching between the input image and a plurality of standard patterns.

In the first embodiment, pattern matching is executed between the standard pattern of a man's face that is stored in advance in a memory space C of the memory 15 and the video data of the first frame obtained after setting the face detection mode, which is stored in the memory space B in step S104. While pattern matching is executed, the display unit 19 displays, as needed, new video data following the first frame obtained after setting the face detection mode, such that the user can monitor the object.

In step S106, the AF/AE/WB detector 17 sets a region (AF region) for detecting an AF (Auto Focus) evaluation value, a region (AE region) for detecting an AE (Auto Exposure) evaluation value, and a region (WB region) for detecting a WB (White Balance) evaluation value on the basis of information on the man's face region detected in step S105. If it is determined in step S105 that no man's face exists, an AF/AE/WB region is set by a general method. Note that the AF/AE/WB region may be set by the CPU 18.

In step S107, for the data of the first frame obtained after setting the face detection mode of the data compressed by the RAW compression scheme in the memory space A in step S102, the data compressed by the RAW compression scheme contained in the AF/AE/WB region set in step S106 is read out to the AF/AE/WB detector 17 to detect an AF/AE/WB evaluation value. Note that the data compressed by the RAW compression scheme includes not only luminance information but also color information.

In step S108, the CPU 18 obtains an AF/AE/WB adjustment amount on the basis of the AF/AE/WB evaluation value detected in step S107, and controls the imaging optical unit 10. Also, the CPU 18 sets the parameters of signal processing in the signal processor 13 on the basis of the AE evaluation value detected in step S107.

As described above, during monitoring of a digital still camera, frame images are successively output from the A/D conversion circuit 12. Thus, the next frame image is input to the signal processor 13 even while processes in steps S105 to S108 are executed. Since determination of the face region and detection of the AF/AE/WB evaluation value are performed for the image of frame 1 serving as a face region detection target, the memory space is switched for each frame to perform processes in steps S102 to S107. This state will be explained with reference to the timing chart of FIG. 3 and the memory space views of FIGS. 4A to 4C.

Frame images are numbered from frame 1, frame 2, frame 3, . . . in the order of input to the signal processor 13. A period during which image data of frame 1 is input is defined as a frame 1 period, and a frame 2 period, frame 3 period, . . . are similarly defined. Assume that, in this state, the position of the man's face is detected for a period of ten frames.

Figure 3:
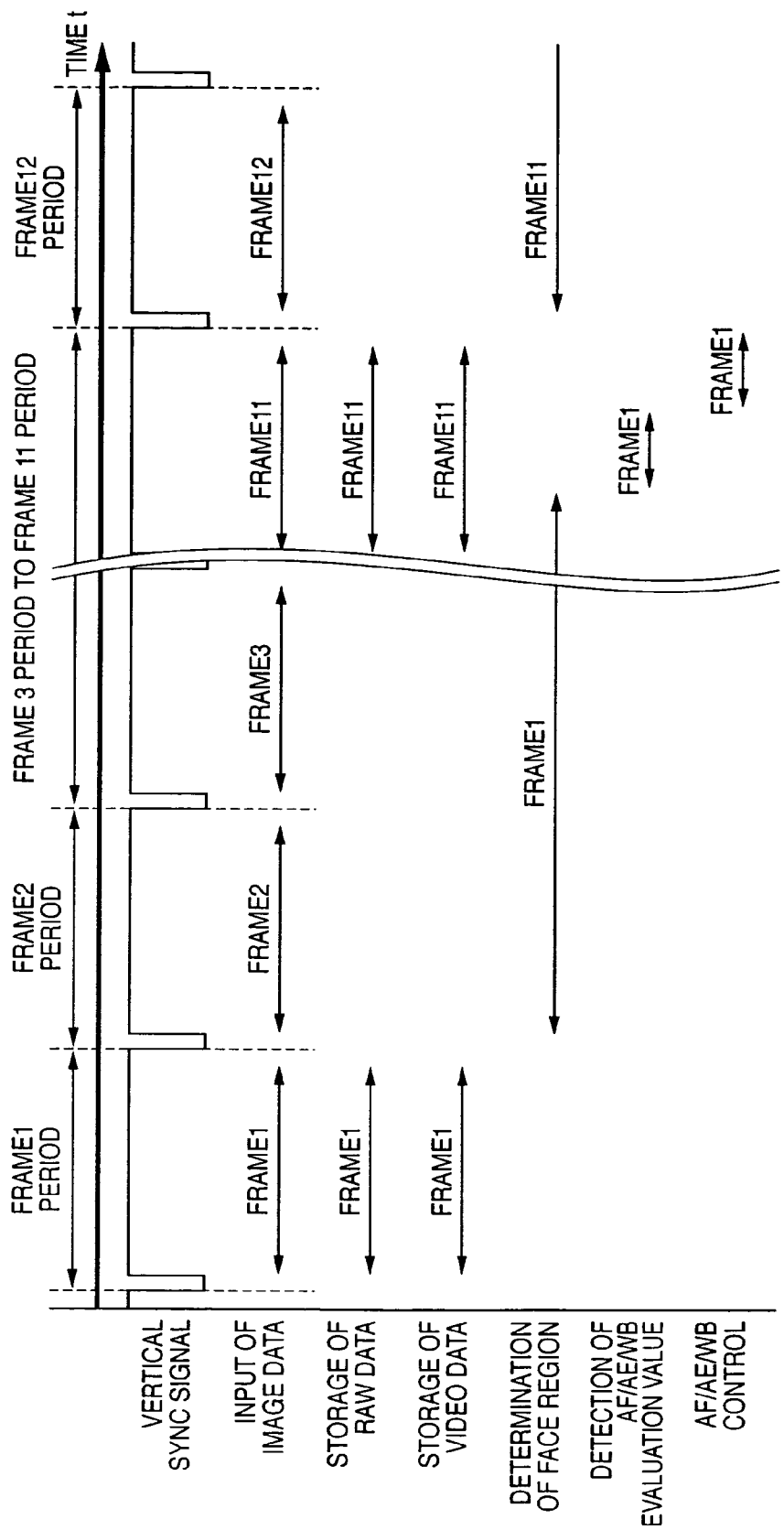
FIG. 3 is a timing chart according to the first embodiment of the present invention.
Figure 5A:
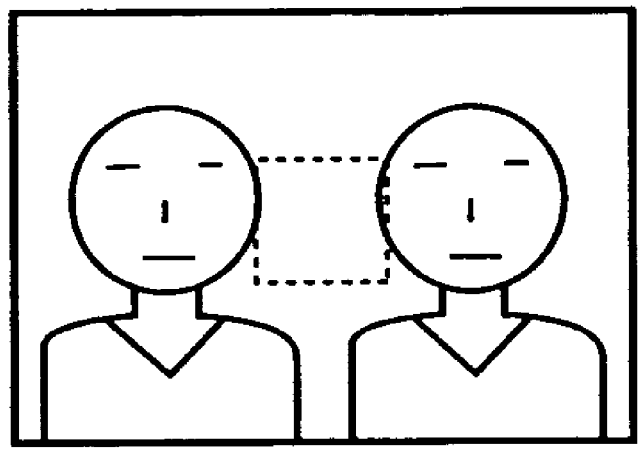
FIGS. 5A and 5B are views showing the positional relationship between the distance measuring/photometry area and a man.
Figure 5B:
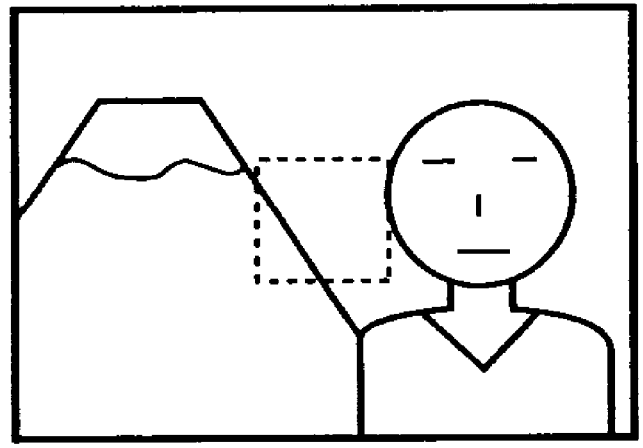

The timing chart of FIG. 3 shows timings at which processes in steps S101 to S108 are done, and frame numbers processed in the respective steps in the frame 1 period to frame 12 period which are delimited by vertical sync signals.

In FIG. 3, input of image data corresponds to step S101; storage of the data compressed by the RAW compression scheme, to step S102; storage of video data, to step S104; determination of the face region, to step S105; detection of the AF/AE/WB evaluation value, to step S107; and AF/AE/WB control, to step S108.

(1) Frame 1 Period

Two processes in steps S102 and S104 described above are parallel-executed for image data of frame 1 input to the signal processor 13, and the data compressed by the RAW compression scheme and video data of frame 1 are respectively stored in the memory spaces A and B. FIG. 4A shows an example of the memory space of the frame 1 period. The memory space C is assumed to store in advance the standard pattern of a face that is used to determine a face region.

(2) Frame 2 Period to Frame 11 Period

In determination of the face region in step S105, video data of frame 1 stored in the memory space B is read out, and the face region is determined by pattern matching with the standard pattern stored in the memory space C. Also, in a frame 2 period to frame 11 period, the image data output from the A/D conversion circuit 12 is continuously input to the signal processor 13, and the display unit 19 performs a display operation by using the video data based on the image data obtained in the frame 2 period to frame 11 period. However, determination of the face region is performed for the video data of frame 1 stored in the memory space B.

In step S106, after completion of determination of the face region (at the timing of obtaining the image of frame 11 in FIG. 3), the CPU 18 sets the AF/AE/WB region for the image of frame 1 recorded in step S105.

In step S107, the AF/AE/WB detector 17 reads out, from the memory space A, the data compressed by the RAW compression scheme of frame 1 set in the AF/AE/WB region in step S106, and detects an AF/AE/WB evaluation value. Note that since the AF evaluation value cannot be calculated from the image of one frame, the evaluation value is detected in consideration of some frames from frame 1 set in the AF/AE/WB region in step S106.

In step S108, the CPU 18 performs AF/AE/WB control on the basis of the evaluation value calculated in step S107. Alternatively, the same processing as that in the frame 1 period is executed for image data of frame 2 input to the signal processor 13. The data compressed by the RAW compression scheme of frame 2 is stored in a memory space A' different from the memory space A, and Video data is stored in a memory space B' different from the memory space B. FIG. 4B shows an example of the memory space in the frame 2 period.

Figure 6A:
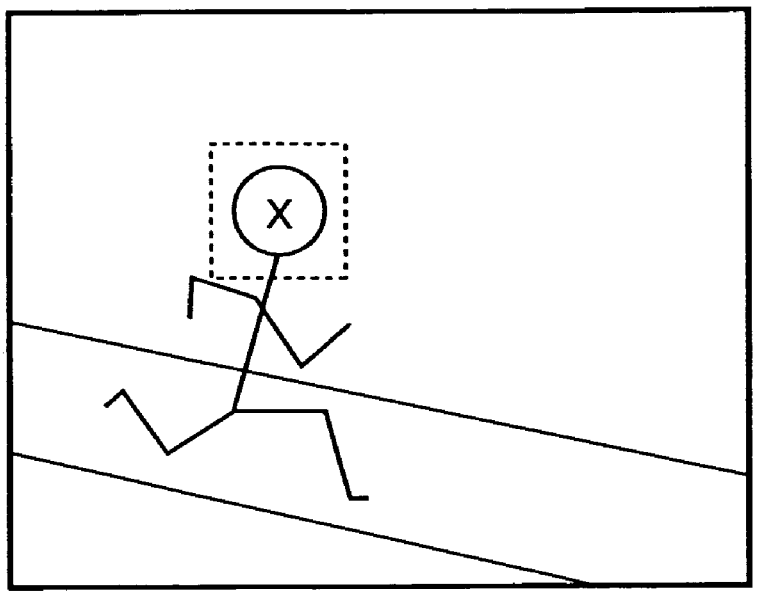
FIGS. 6A and 6B are views each showing a captured image of a moving man.
Figure 6B:
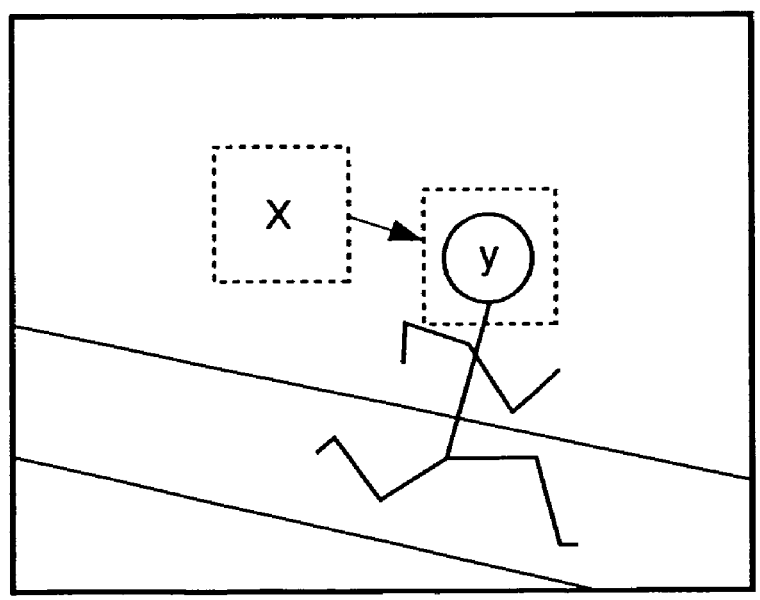

For example, when images shown in FIGS. 6A and 6B are captured as the captured images of frames 1 and 11, the data compressed by the RAW compression scheme and video data in FIG. 6A are stored in the memory 15 in the frame 1 period, and the data compressed by the RAW compression scheme and video data in FIG. 6B are stored in the frame 11 period. The result of detecting a face position from the video data in FIG. 6A is an x region surrounded by a dotted line. AF/AE/WB control is executed on the basis of an AF/AE/WB evaluation value detected from the data compressed by the RAW compression scheme in the x region in FIG. 6A.

(3) Frame 12 Period and Subsequent Period

In the frame 12 period and subsequent period, the same processing as that in the frame 2 period to frame 11 period is executed, and the write/read memory space in the memory 15 is alternately switched for each frame. In the frame 3 period, write in the memory 15 is done in the memory spaces A and B in steps S102 and S104, and read from the memory 15 is done in the memory spaces B' and A' in step S105. FIG. 4C shows an example of the memory space after the frame 22 period.

(4) Still Image Capturing

By storing an AE evaluation value obtained during monitoring in the memory 15, the AE evaluation value can be used to set the parameters of gamma processing, interpolation processing, matrix conversion, and the like in the signal processor 13 also in still image capturing following monitoring.

As described above, in the first embodiment, although new image data in the frame 2 period to frame 10 period are obtained between the start and end of detection of the face region for the image of frame 1, AF/AE/WB evaluation detection is executed by using the stored image of frame 1 upon obtaining the result of detecting the face region in the frame 11 period. That is, detection of the face region and detection of the AF/AE/WB evaluation value are executed for the same frame, thereby performing focus adjustment and exposure control to the man's face at a higher precision than the conventional one, and is resistant to movement of a man and camera shake.

Second Embodiment

Figure 7:
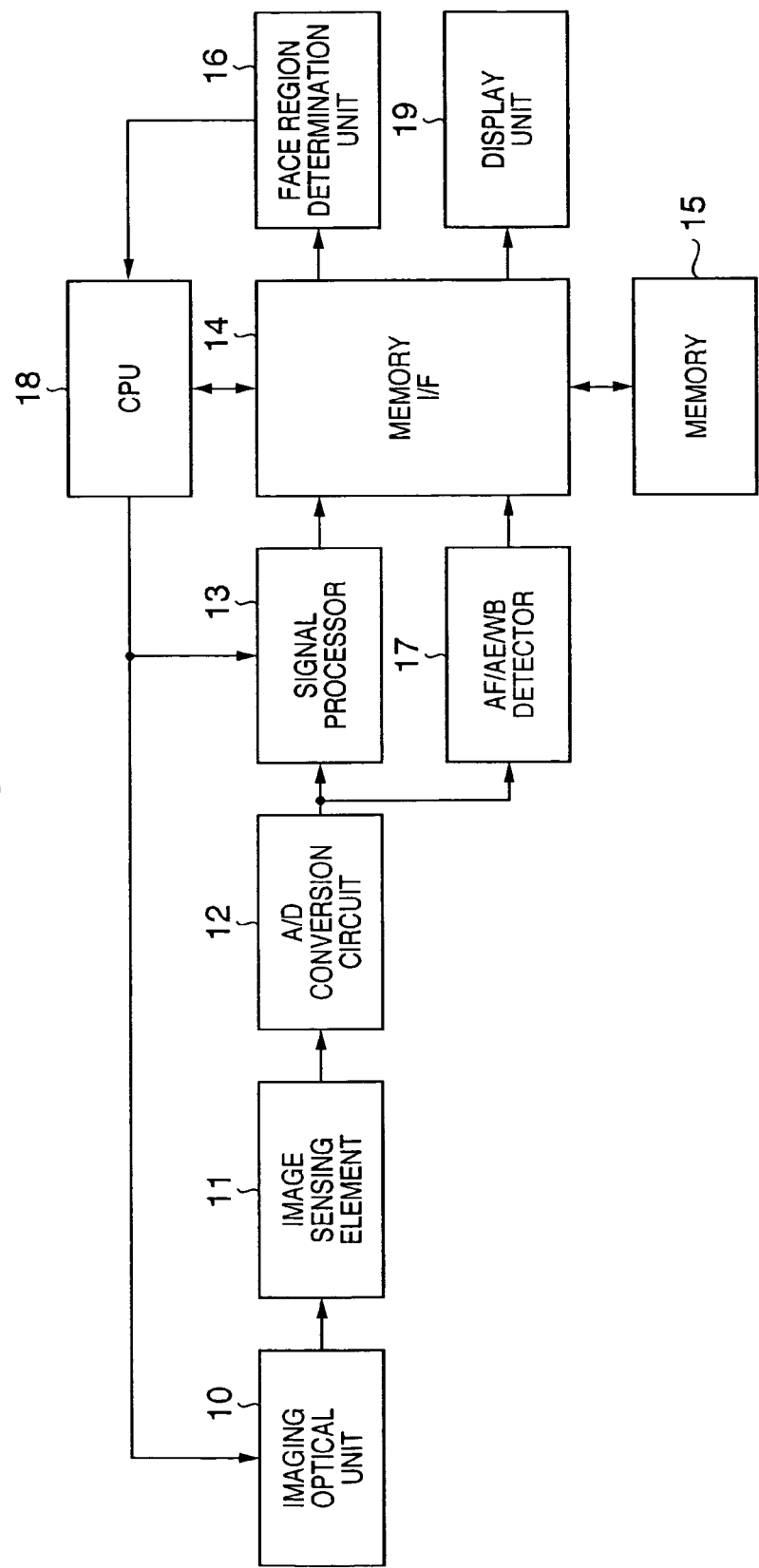
FIG. 7 is a functional block diagram showing an image capturing apparatus according to the second embodiment of the present invention.

FIG. 7 is a functional block diagram showing an image capturing apparatus according to the second embodiment of the present invention.

In FIG. 7, reference numeral 10 denotes an imaging optical unit which is formed from a lens, stop, and the like, and performs focus adjustment and exposure adjustment; 11, an image sensing element such as a CCD which converts an optical image into an electrical signal; 12, an A/D conversion circuit which converts an analog image signal from the image sensing element 11 into digital image data; 13, a signal processor which performs gamma processing, interpolation processing, matrix conversion, and the like for image data output from the A/D conversion circuit 12, and creates video data; 14, a memory I/F which executes write/read of video data and various control data with a memory (DRAM) 15; 16, a face region determination unit which determines the region of a man's face from video data; 17, an AF/AE/WB detector which detects an AF/AE/WB evaluation value; 18, a CPU which manages various control operations, controls the imaging optical unit on the basis of an evaluation value from the AF/AE/WB detector 17, and sets the parameters of signal processing in the signal processor 13; and 19, a display unit which includes a liquid crystal monitor or the like for displaying, as needed, the video data created by the signal processor 13, and causing a user to observe the details of an object in real time.

Figure 8:
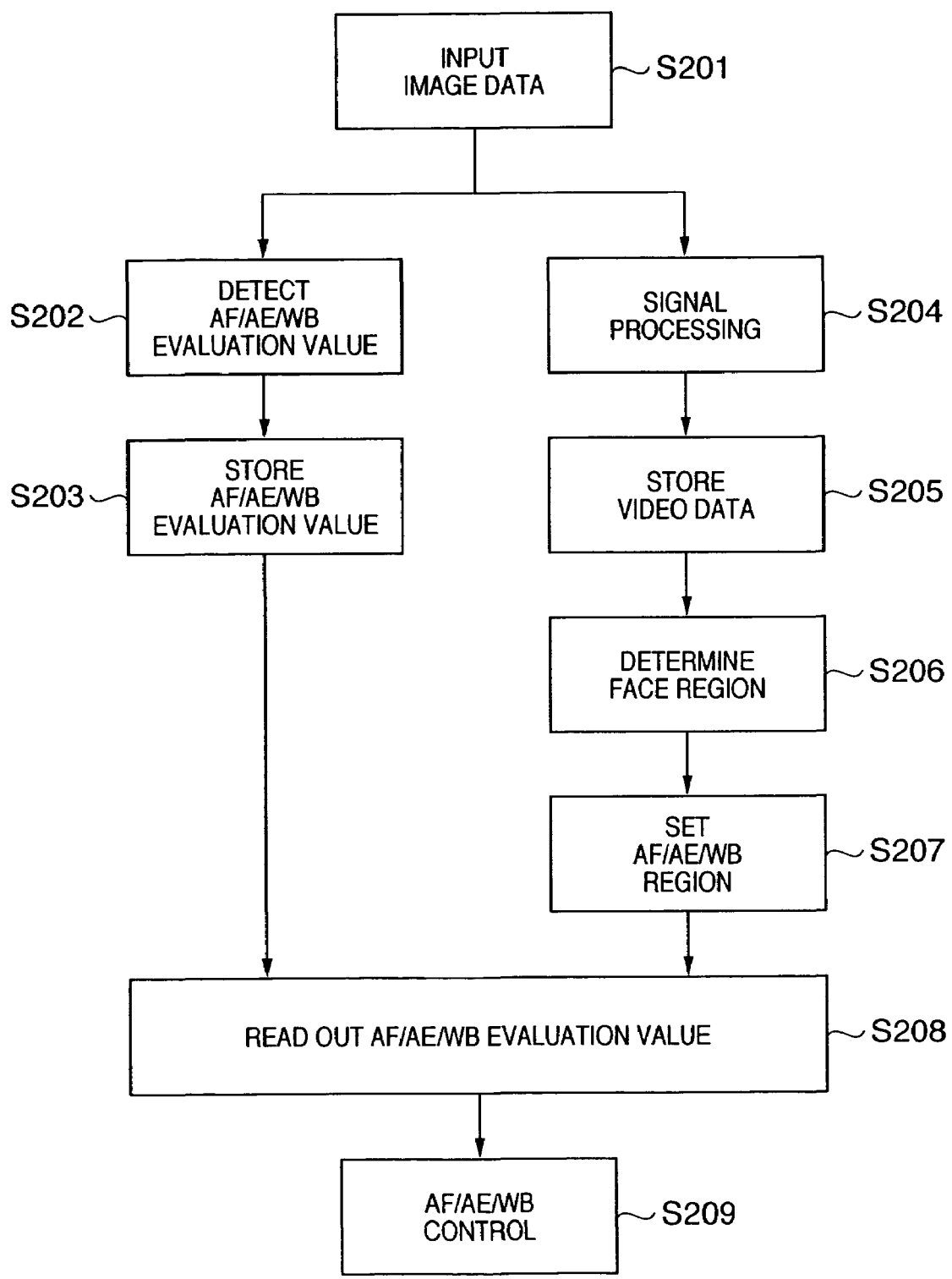
FIG. 8 is a flowchart showing processing according to the second embodiment of the present invention.

The operation of the image capturing apparatus according to the second embodiment of the present invention will be explained with reference to the flowchart shown in FIG. 8.

A digital still camera monitors an image to be captured on the display unit 19 before image capturing. In the second embodiment, the position of a man's face and an AF/AE/WB evaluation value are extracted during monitoring.

In step S201, upon setting a face detection mode for detecting a face for the monitored image, light incident on the imaging optical unit 10 is formed into an image on the light-receiving surface of the image sensing element 11, and output as an analog image signal from the image sensing element 11. The analog image signal is converted into digital image data by the A/D conversion circuit 12, and the digital image data is input to the signal processor 13 and AF/AE/WB detector 17.

Note that, in this case, the signal input is started to the signal processor 13 by setting the face detection mode. However, the signal input may be started to the signal processor 13 by pressing a release button halfway (SW1).

In step S202, the AF/AE/WB detector detects an AF/AE/WB evaluation value from the image data which is first input after setting the face detection mode.

In step S203, the CPU 18 stores an integral value of the AF/AE//WB evaluation value in a predetermined memory space (memory space A) of the memory 15 via the memory I/F 14.

At this time, the entire frame is divided into, e.g., 16×16=256 blocks, and the integral value of an AF/AE/WB evaluation value in each block is stored in the memory 15. The data amount stored in the memory 15 can be reduced in comparison with the first embodiment in which the data compressed by the RAW compression scheme is stored in the memory 15. The AF evaluation value is obtained by causing image data to pass through a high-pass filter or bandpass filter, and contains only a frequency component of a specific range. The frequency of the AF evaluation value is converted into a low-frequency component and decimated (data decimation) to reduce the data amount stored in the memory 15.

In step S204, the signal processor 13 executes gamma processing, interpolation processing, matrix conversion, and the like for input image data to create video data.

In step S205, the CPU 18 stores video data created in step S204 via the memory I/F 14 in a predetermined memory space (memory space B) of the memory 15 that is different from the memory space A. The image data stored in step S102 and the video data created in the step S103 are based on the same image data output from the A/D conversion circuit 12.

In step S206, the face region determination unit 16 detects the region of a man's face by using the video data of the first frame obtained after setting the face detection mode stored in the memory space B in step S205. As a method of detecting the region of a man's face, a method using an eigenface by the analysis of a main component (M. A. Turk and A. P. Pentland, "Face reognition using eigenfaces", Proc. of IEEE Conf. on Computer Vision and Pattern Recognition, pp. 586-591, 1991.), and a method utilizing a feature point such as an eye, nose, or mouth (in Japanese Patent Laid-Open No. 09-251534) are proposed and applicable. According to these methods, whether an input image is an image of a man's face is determined by pattern matching between the input image and a plurality of standard patterns.

In the second embodiment, pattern matching is executed between the standard pattern of a man's face that is stored in advance in the memory space C of the memory 15 and video data stored in the memory space B in step S205. While pattern matching is executed, the display unit 19 displays, as needed, new video data following the first frame obtained after setting the face detection mode, such that the user can monitor the object.

In step S207, the CPU 18 sets a region (AF region) for detecting an AF evaluation value and a region (AE region) for detecting an AE evaluation value, and a region (WB region) for detecting a WB (White Balance) evaluation value on the basis of information on the man's face region detected in step S206. If it is determined in step S206 that no man's face exists, the AF/AE/WB region is set by a general method.

In step S208, of AF/AE/WB evaluation values stored in the memory space A in step S203, the AF/AE/WB evaluation value of a region (one or a plurality of blocks among the 256 divided blocks described above) contained in the AF/AE/WB region set in step S207 is read out.

In step S209, the CPU 18 obtains an AF/AE/WB adjustment amount to control the imaging optical unit 10. Also, the parameters of signal processing in the signal processor 13 are set on the basis of the AE evaluation value detected in step S208.

As described above, during monitoring of a digital still camera, frame images are successively output from the A/D conversion circuit 12. Thus, the next frame image is input to the signal processor 13 and AF/AE/WB detector 17 even while processes in steps S206 to S209 are executed. Since detection of the AF/AE/WB evaluation value is performed for an image of frame 1 serving as a face region detection target, the memory space is switched for each frame to perform processes in steps S202 to S208. This state will be explained with reference to the timing chart of FIG. 9 and the memory space views of FIGS. 10A, 10B, and 10C.

Frame images are numbered from frame 1, frame 2, frame 3, . . . in the order of input to the signal processor 13 and AF/AE/WB detector 17. A period during which image data of frame 1 is input is defined as a frame 1 period, and a frame 2 period, frame 3 period, . . . are similarly defined. Assume that, in this state, the position of the man's face is detected for a period of ten frames.

Figure 9:
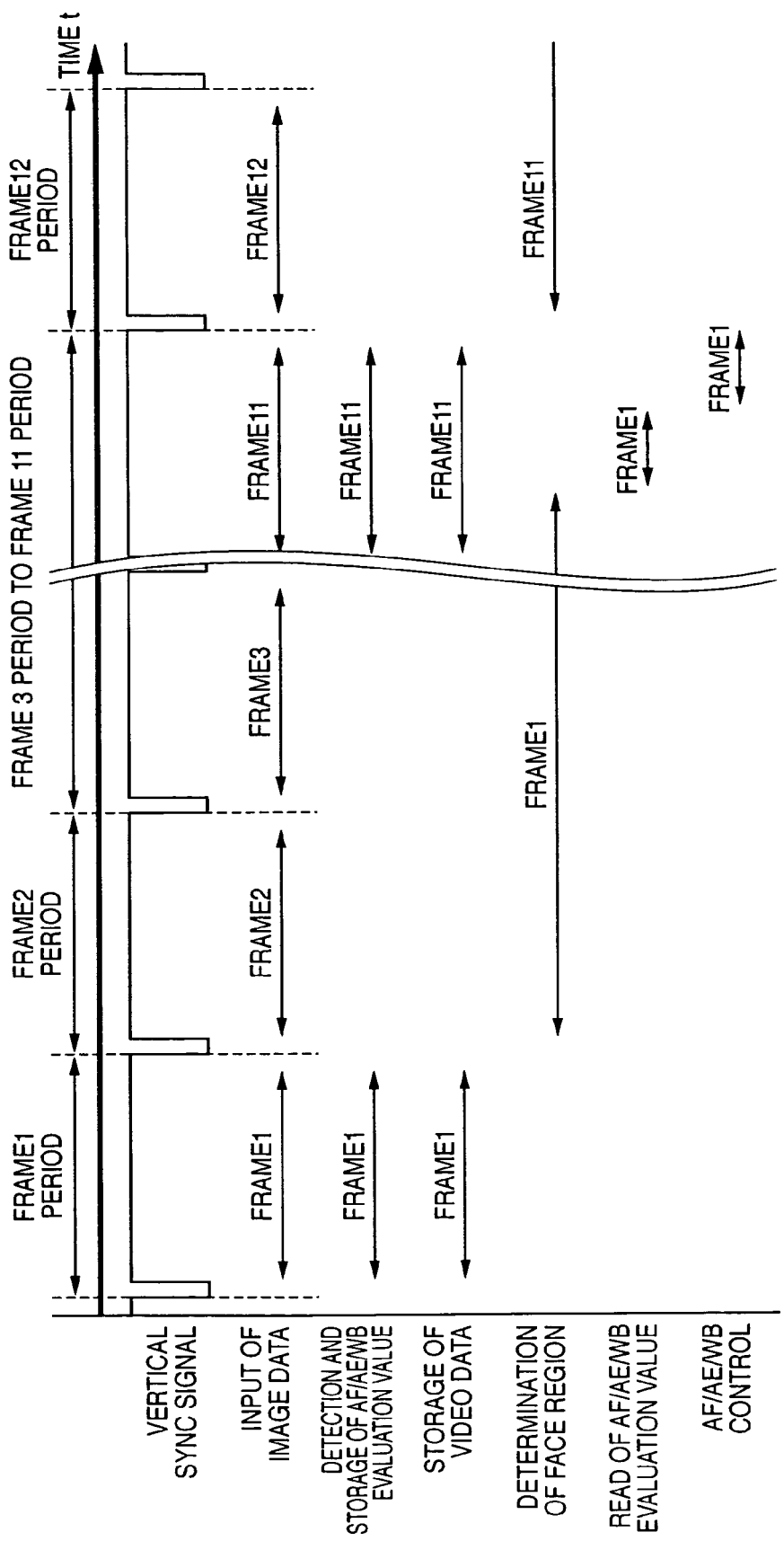
FIG. 9 is a timing chart according to the second embodiment of the present invention.

The timing chart of FIG. 9 shows timings at which processes in steps S201 to S209 are done, and frame numbers processed in the respective processes in the frame 1 period to frame 12 period which are delimited by vertical sync signals. In FIG. 9, input of image data corresponds to step S201; detection and storage of an AF/AE/WB evaluation value, to steps S202 and S203; storage of video data, to step S205; determination of the face region, to step S206; read of the AF/AE/WB evaluation value, to step S208; and AF/AE/WB control, to step S209.

(1) Frame 1 Period

Figure 10:
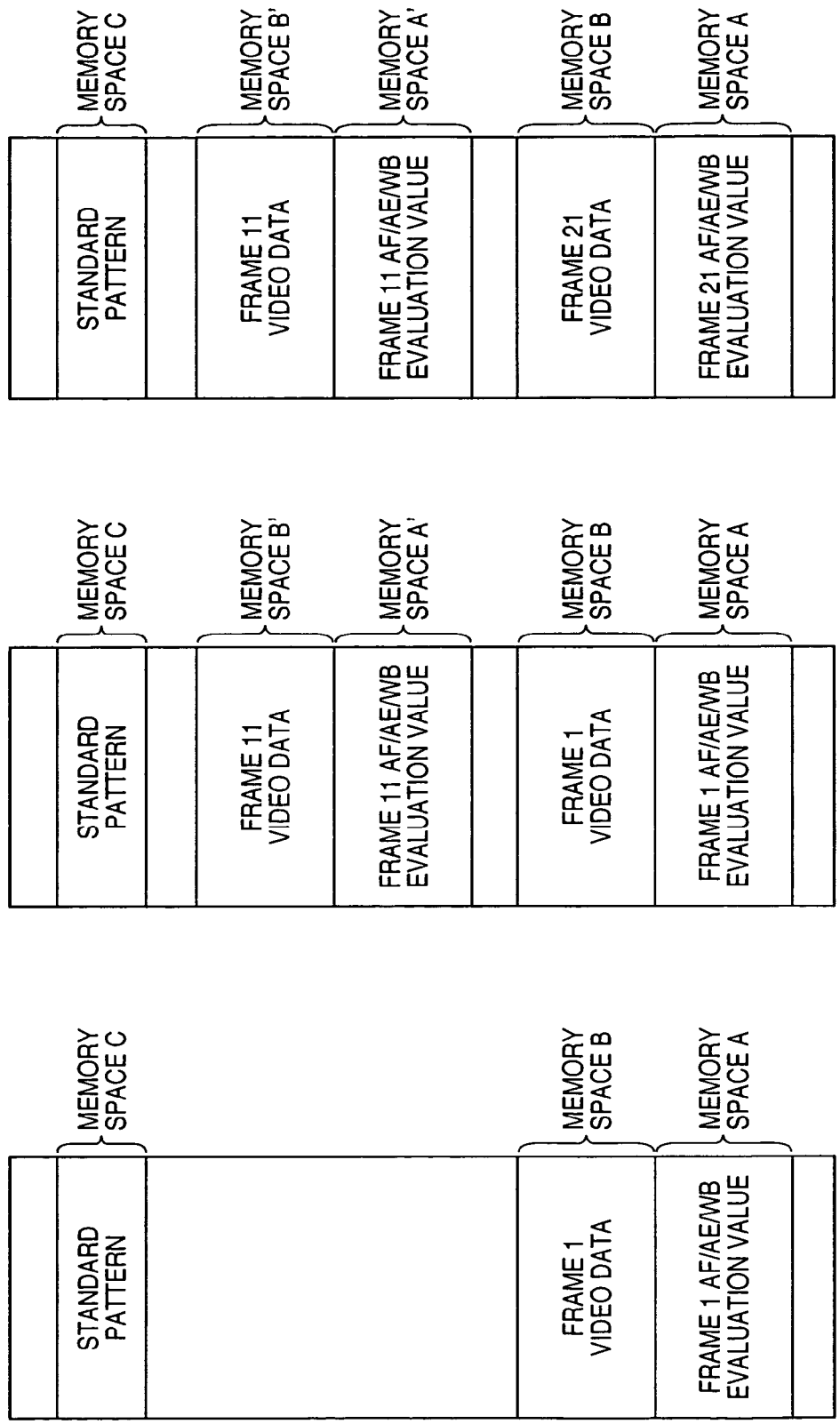
FIGS. 10A, 10B, and 10C are views showing the memory space of a memory according to the second embodiment of the present invention.

Image data of frame 1 parallel-undergoes processes in steps S202 and S203 by the AF/AE/WB detector 17, and a process in step S205 by the signal processor 13. The AF/AE/WB evaluation value and video data of frame 1 are respectively stored in the memory spaces A and B. FIG. 10A shows an example of the memory space of the frame 1 period. The memory space C is assumed to store in advance the standard pattern of a face that is used to determine a face region.

(2) Frame 2 Period to Frame 11 Period

In determination of the face region in step S206, video data of frame 1 stored in the memory space B is read out, and the face region is determined by pattern matching with the standard pattern stored in the memory space C. Also, in a frame 2 period to frame 11 period, the image data output from the A/D conversion circuit 12 is continuously input to the signal processor 13, and the display unit 19 performs a display operation by using the video data based on the image data obtained in the frame 2 period to frame 11 period. However, determination of the face region is performed for the video data of frame 1 stored in the memory space B.

In step S207, after completion of determination of the face region, a CPU 18 sets the AF/AE/WB region for the data of frame 1 serving as the face region detection target, which is recorded in step S206.

In step S208, the AF/AE/WB detector 17 reads out, from the memory 15, the AF/AE/WB evaluation value of frame 1 set in the AF/AE/WB region in step S207. Note that since the AF evaluation value cannot be calculated from the image of one frame, the evaluation value is detected in consideration of some frames from frame 1 set in the AF/AE/WB region in step S207. In step S209, the CPU 18 performs AF/AE/WB control on the basis of the evaluation value read out in step S208.

Alternatively, the same processing as that in the frame 1 period is executed for image data of frame 2. The AF/AE/WB evaluation value of frame 2 is stored in a memory space A' different from the memory space A, and video data is stored in a memory space B' different from the memory space B. FIG. 10B shows an example of the memory space in the frame 2 period.

For example, when images shown in FIGS. 6A and 6B are captured as the captured images of frames 1 and 11, the AF/AE/WB evaluation value and video data in FIG. 6A are stored in the memory 15 in the frame 1 period, and the AF/AE/WB evaluation value and video data in FIG. 6B are stored in the frame 11 period. The result of detecting a face position from the video data in FIG. 6A is an x region surrounded by a dotted line. AF/AE/WB control is performed by reading out from the memory 15 an AF/AE/WB evaluation value obtained from the x region in FIG. 6A.

(3) Frame 12 Period and Subsequent Period

In the frame 12 period and subsequent period, the same processing as that in the frame 2 period to frame 11 period is executed, and the write/read memory space in the memory 15 is alternately switched for each frame. In the frame 12 period, write in the memory 15 is done in the memory spaces A and B in steps S203 and S205, and read from the memory 15 is done in the memory spaces B' and A' in step S206. FIG. 10C shows an example of the memory space after the frame 22 period.

(4) Still Image Capturing

By storing an AE evaluation value obtained during monitoring in the memory 15, the AE evaluation value can be used to set the parameters of gamma processing, interpolation processing, matrix conversion, and the like in the signal processor 13 also in still image capturing following monitoring.

As described above, in the second embodiment, although new image data in the frame 2 period to frame 10 period are obtained between the start and end of detection of the face region for the image of frame 1, AF/AE/WB evaluation value is read out from the stored image of frame 1 upon obtaining the result of detecting the face region in the frame 11 period. That is, detection of the face region and detection of the AF/AE/WB evaluation value are executed for the same frame, thereby performing focus adjustment and exposure control to the man's face at a higher precision than the conventional one, and is resistant to movement of a man and camera shake.

Third Embodiment

The third embodiment is different from the first embodiment that detection of an AF/AE/WB evaluation value is executed on the basis of a captured image in which a change amount with respect to an image of a frame serving as a face region detection target falls within a predetermined value, while detection of the AF/AE/WB evaluation value is executed for an image of frame 1 in the first embodiment.

The arrangement of an image capturing apparatus in this embodiment is the same as that in the first embodiment, and a description thereof will be omitted.

Figure 11:
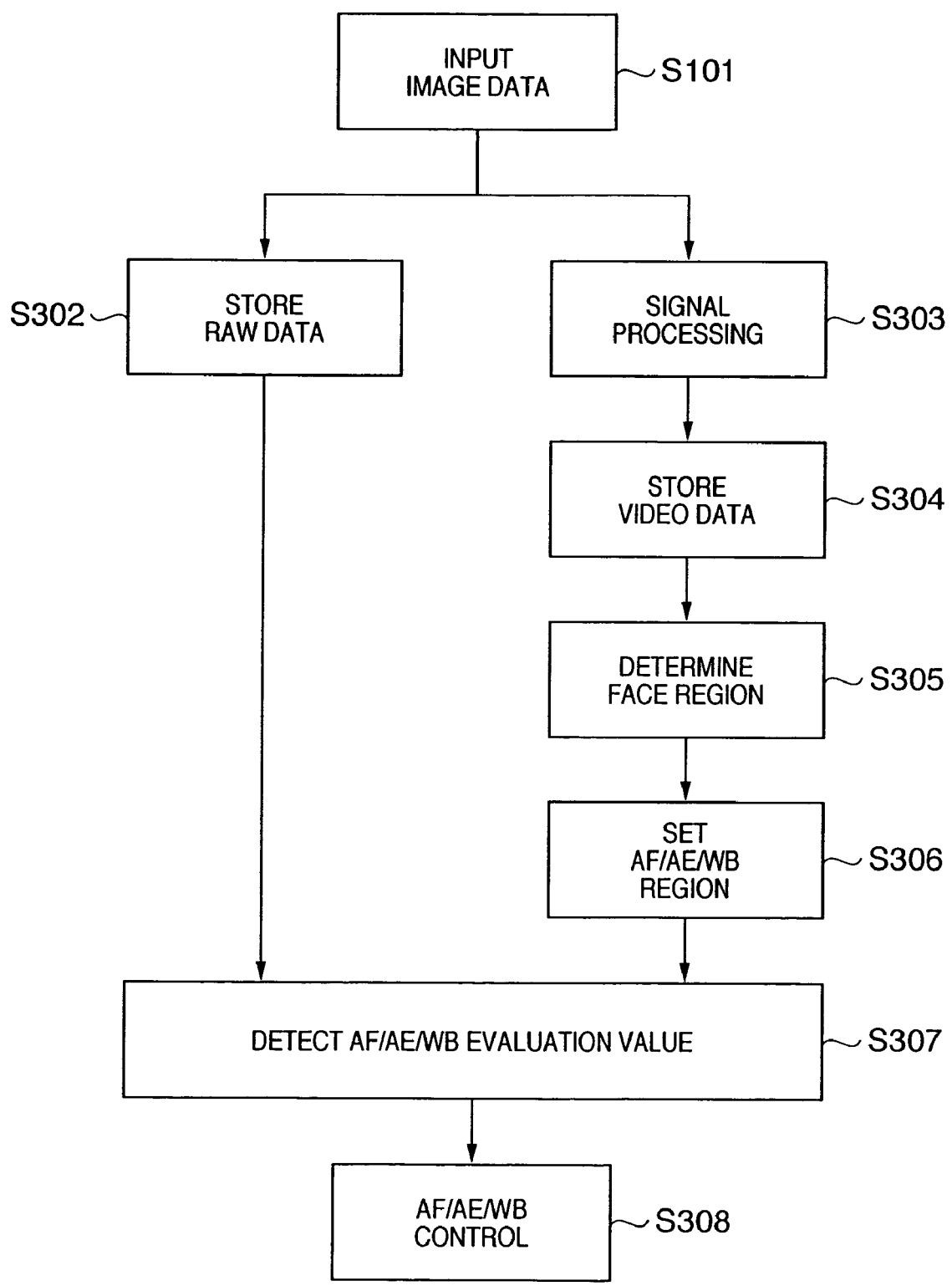
FIG. 11 is a flowchart showing processing according to the third embodiment of the present invention.

The operation of the image capturing apparatus according to the third embodiment of the present invention will be explained with reference to the flowchart shown in FIG. 11.

A digital still camera monitors an image to be captured on the display unit 19 before image capturing. In the third embodiment, the position of a man's face and an AF/AE/WB evaluation value are extracted during monitoring.

In step S301, upon setting a face detection mode for detecting a face for the monitored image, light incident on the imaging optical unit 10 is formed into an image on the light-receiving surface of the image sensing element 11, and output as an analog image signal from the image sensing element 11. The analog image signal is converted into digital image data by the A/D conversion circuit 12, and the digital image data is input to the signal processor 13. Note that, in this case, the signal input is started to the signal processor 13 by setting the face detection mode. However, the signal input may be started to the signal processor 13 by pressing a release button halfway (SW1).

The signal processor 13 parallel-executes two processes in steps S302 and S303. In step S302, input image data is stored directly (as data compressed by a RAW compression scheme) in a predetermined memory space (memory space A) of the memory 15 via the memory I/F 14. In step S303, input image data undergoes gamma processing, interpolation processing, matrix conversion, and the like to create video data.

In step S304, the CPU 18 stores the video data created in step S303 via the memory I/F 14 in a predetermined memory space (memory space B) of the memory 15 that is different from the memory space A. The image data stored in step S302 and the video data created in the step S303 are based on the same image data output from the A/D conversion circuit 12.

In step S305, the face region determination unit 16 detects the region of a man's face by using the video data of the first frame obtained after setting the face detection mode, which is stored in the memory space B in step S304.

As a method of detecting the region of a man's face, a method using an eigenface by the analysis of a main component (M. A. Turk and A. P. Pentland, "Face recognition using eigenfaces", Proc. of IEEE Conf. on Computer Vision and Pattern Recognition, pp. 586-591, 1991.), and a method utilizing a feature point such as an eye, nose, or mouth (in Japanese Patent Laid-Open No. 09-251534) are proposed and applicable. According to these methods, whether an input image is an image of a man's face is determined by pattern matching between the input image and a plurality of standard patterns.

In the third embodiment, pattern matching is executed between the standard pattern of a man's face that is stored in advance in a memory space C of the memory 15 and the video data of the first frame obtained after setting the face detection mode, which is stored in the memory space B in step S304. While pattern matching is executed, the display unit 19 displays, as needed, new video data following the first frame obtained after setting the face detection mode, such that the user can monitor the object.

In step S306, the AF/AE/WB detector 17 sets a region (AF region) for detecting an AF (Auto Focus) evaluation value and a region (AE region) for detecting an AE (Auto Exposure) evaluation value on the basis of information on the man's face region detected in step S305. If it is determined in step S305 that no man's face exists, an AF/AE/WB region is set by a general method. Note that the AF/AE/WB region may be set by the CPU 18.

In step S307, the data compressed by the RAW compression scheme contained in the AF/AE/WB region set in step S306 is read out to the AF/AE/WB detector 17 to detect an AF/AE/WB evaluation value, for the latest image data in which the change amount with respect to the image of frame 1 serving as the face region detection target falls within a predetermined value, of the data compressed by the RAW compression scheme in the frame 1 period and subsequent period in the memory space A in step S302. Note that the data compressed by the RAW compression scheme includes not only luminance information but also color information.

In step S308, the CPU 18 obtains an AF/AE/WB adjustment amount on the basis of the AF/AE/WB evaluation value detected in step S307, and controls the imaging optical unit 10. Also, the CPU 18 sets the parameters of signal processing in the signal processor 13 on the basis of the AE evaluation value detected in step S307.

As described above, during monitoring of a digital still camera, frame images are successively output from the A/D conversion circuit 12. Thus, the next frame image is input to the signal processor 13 even while processes in steps S305 to S308 are executed. Since determination of the face region and detection of the AF/AE/WB evaluation value are performed on the basis of the captured image in which the change amount falls within the predetermined value with respect to the image of frame 1 serving as a face region detection target, the memory space is switched for each frame to perform processes in steps S302 to S307. This state will be explained with reference to the timing chart of FIG. 12 and the memory space views of FIGS. 13A to 13C.

Frame images are numbered from frame 1, frame 2, frame 3, . . . in the order of input to the signal processor 13. A period during which image data of frame 1 is input is defined as a frame 1 period, and a frame 2 period, frame 3 period, . . . are similarly defined. Assume that, in this state, the position of the man's face is detected for a period of ten frames.

Figure 12:
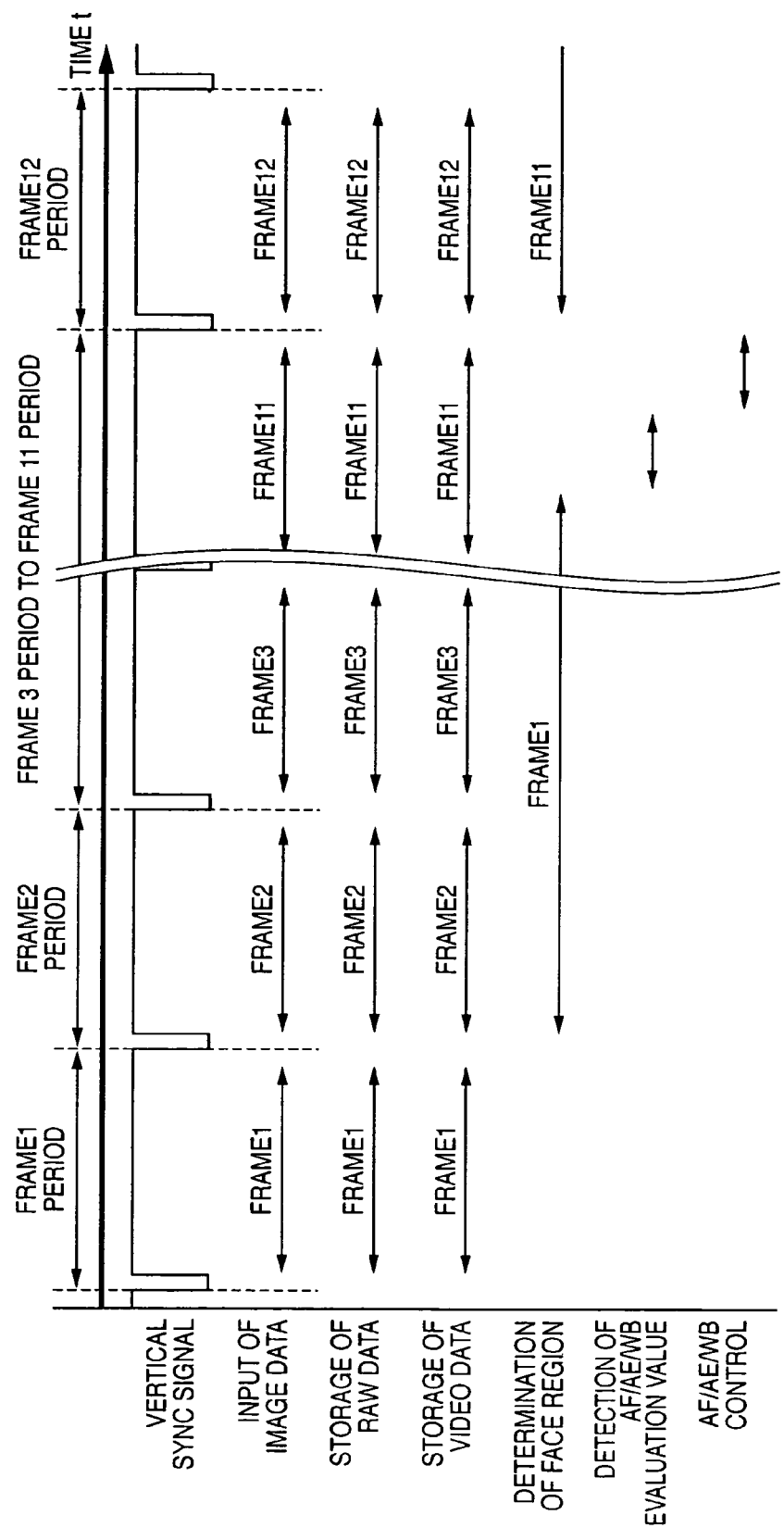
FIG. 12 is a timing chart according to the third embodiment of the present invention.

The timing chart of FIG. 12 shows timings at which processes in steps S301 to S308 are done, and frame numbers processed in the respective steps in the frame 1 period to frame 12 period which are delimited by vertical sync signals. In FIG. 12, input of image data corresponds to step S301; storage of the data compressed by the RAW compression scheme, to step S302; storage of video data, to step S304; determination of the face region, to step S305; detection of the AF/AE/WB evaluation value, to step S307; and AF/AE/WB control, to step S308.

(1) Frame 1 Period

Figure 13C:
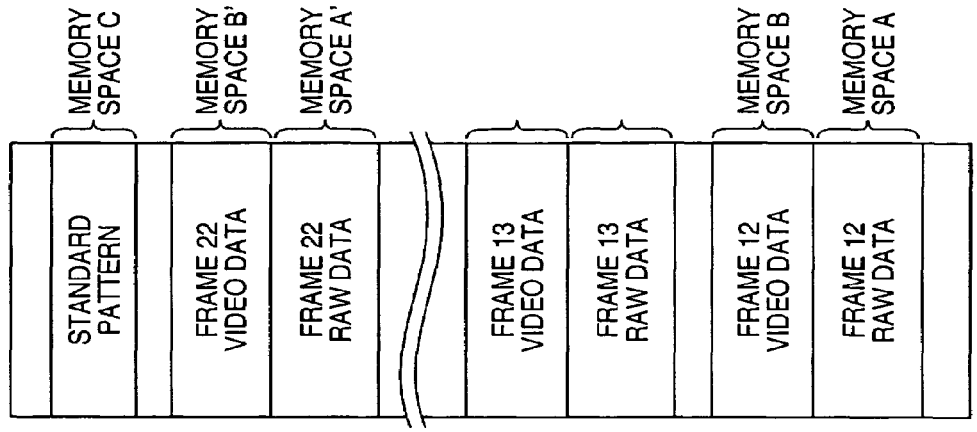
FIGS. 13A, 13B, and 13C are views showing the memory space of a memory according to the third embodiment of the present invention.
Figure 13B:
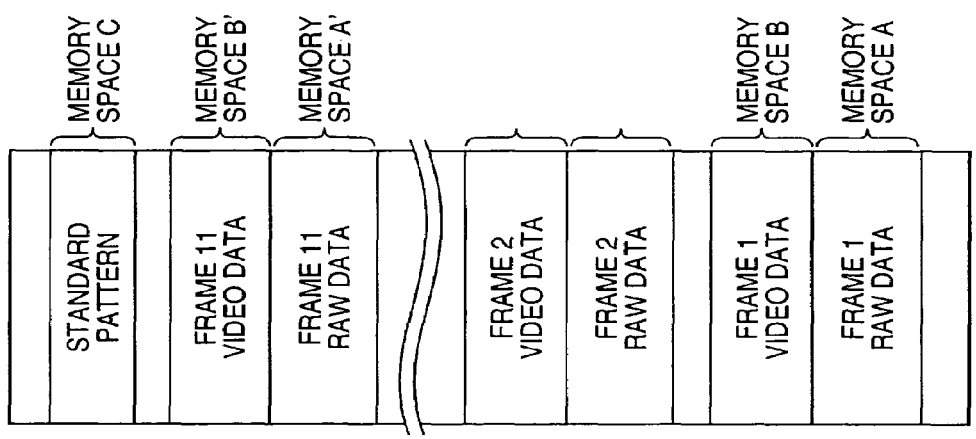
Figure 13A:
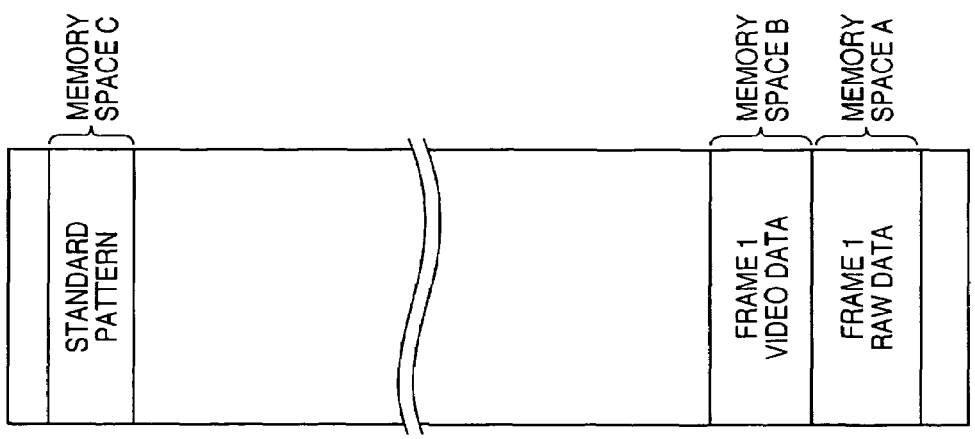

Two processes in steps S302 and S304 described above are parallel-executed for image data of frame 1 input to the signal processor 13, and the data compressed by the RAW compression scheme and video data of frame 1 are respectively stored in the memory spaces A and B. FIG. 13A shows an example of the memory space of the frame 1 period. The memory space C is assumed to store in advance the standard pattern of a face that is used to determine a face region.

(2) Frame 2 Period to Frame 11 Period

In determination of the face region in step S305, video data of frame 1 stored in the memory space B is read out, and the face region is determined by pattern matching with the standard pattern stored in the memory space C. Also, in a frame 2 period to frame 11 period, the image data output from the A/D conversion circuit 12 is continuously input to the signal processor 13, and the display unit 19 performs a display operation by using the video data based on the image data obtained in the frame 2 period to frame 11 period. However, determination of the face region is performed for the video data of frame 1 stored in the memory space B. The same processing as that in the frame 1 period is executed for image data of frames 2 to 11, and data compressed by the RAW compression scheme of frames 2 to 11 are sequentially stored in a memory space different from the memory space A, and video data is also sequentially stored in a memory space different from the memory space B. FIG. 13B shows an example of the memory space after completion of the frame 11 period. The data compressed by the RAW compression scheme of frame 11 is stored in a memory space A', and the video data of frame 11 is stored in a memory space B' in FIG. 13B.

In step S306, the CPU 18 calculates the correlation between the image of frame 1 serving as a face region detection target recorded in step S305, and the images of frames 2 to 11. On the basis of the calculated correlation value, the CPU 18 determines whether the change amount between the frames falls within a tolerance. If the change amount falls within the tolerance, it is determined that a scene is not changed. The CPU 18 thus sets the AF/AE/WB region for the image of the latest frame in which the change amount falls within the tolerance.

In step S307, the AF/AE/WB detector 17 reads out, from the memory space A, the data compressed by the RAW compression scheme of a frame corresponding to a frame set in the AF/AE/WB region in step S306, and detects an AF/AE evaluation value. Note that since the AF evaluation value cannot be calculated from the image of one frame, the evaluation value is detected in consideration of some frames with reference to the frame set in the AF/AE/WB region in step S306. Note that if detection of the evaluation value is complete, the CPU 18 erases the stored data of frames 1 to 11.

In step S308, the CPU 18 performs AF/AE/WB control on the basis of the evaluation value calculated in step S307. Alternatively, the same processing as that in the frame 1 period is executed for image data of frame 2 input to the signal processor 13. The data compressed by the RAW compression scheme of frame 2 is stored in a memory space A' different from the memory space A, and video data is stored in a memory space B' different from the memory space B. FIG. 13B shows an example of the memory space in the frame 2 period.

For example, when images shown in FIGS. 6A and 6B are captured as the captured images of frames 1 and 11, the data compressed by the RAW compression scheme and video data in FIG. 6A are stored in the memory 15 in the frame 1 period, and the data compressed by the RAW compression scheme and video data in FIG. 6B are stored in the frame 11 period. The result of detecting a face position from the video data in FIG. 6A is an x region surrounded by a dotted line. AF/AE/WB control is executed on the basis of an AF/AE/WB evaluation value detected from the data compressed by the RAW compression scheme in the x region in FIG. 6A.

(3) Frame 12 Period and Subsequent Period

In the frame 12 period and subsequent period, the same processing as that in the frame 2 period to frame 11 period is executed, and the write/read memory space in the memory 15 is alternately switched for each frame. In the frame 3 period, write in the memory 15 is done in the memory spaces A and B in steps S302 and S304, and read from the memory 15 is done in the memory spaces B' and A' in step S305. FIG. 13C shows an example of the memory space in the frame 22 period.

(4) Still Image Capturing

By storing an AE evaluation value obtained during monitoring in the memory 15, the AE evaluation value can be used to set the parameters of gamma processing, interpolation processing, matrix conversion, and the like in the signal processor 13 also in still image capturing following monitoring.

Note that, in the third embodiment, the AF/AE/WB region is set for the image of the last frame in which the scene change amount falls within the tolerance. However, any other images may be used for setting the region as long as the scene change amount falls within the tolerance in the image of the frame.

Also, the AF/AE/WB region may be set for the image of the (high-evaluation) frame in which the scene change amount is smallest in the images of frames in which the scene change amounts fall within the tolerance.

Also, when no image of the frame in which the scene change amount falls within the tolerance exists, for example, general evaluation/photometry processing is performed, the AF/AE/WB region is set, and the AF/AE/WB control is performed.

As described above, in the third embodiment, the AF/AE/WB evaluation value can be detected on the basis of the captured image in which the change amount with respect to the image of the frame serving as the face region detection target falls within the predetermined value. Hence, focus adjustment and exposure control to the man's face can be performed at a higher precision than the conventional one, and is resistant to movement of the man and camera shake.

Also, the AF/AE/WB evaluation value can be detected on the basis of the image of the frame which is the latest in a temporal order. Hence, even if a composition itself is not changed, exposure control can be performed at a high precision even when brightness or the like in an entire scene changes in accordance with temporal variation.

Fourth Embodiment

The fourth embodiment is different from the second embodiment that detection of an AF/AE/WB evaluation value is executed on the basis of a captured image in which a change amount with respect to an image of a frame serving as a face region detection target falls within a predetermined value, while detection of the AF/AE/WB evaluation value is executed for data of frame 1 in the second embodiment.

The arrangement of an image capturing apparatus in this embodiment is the same as that in the first embodiment, and a description thereof will be omitted.

Figure 14:
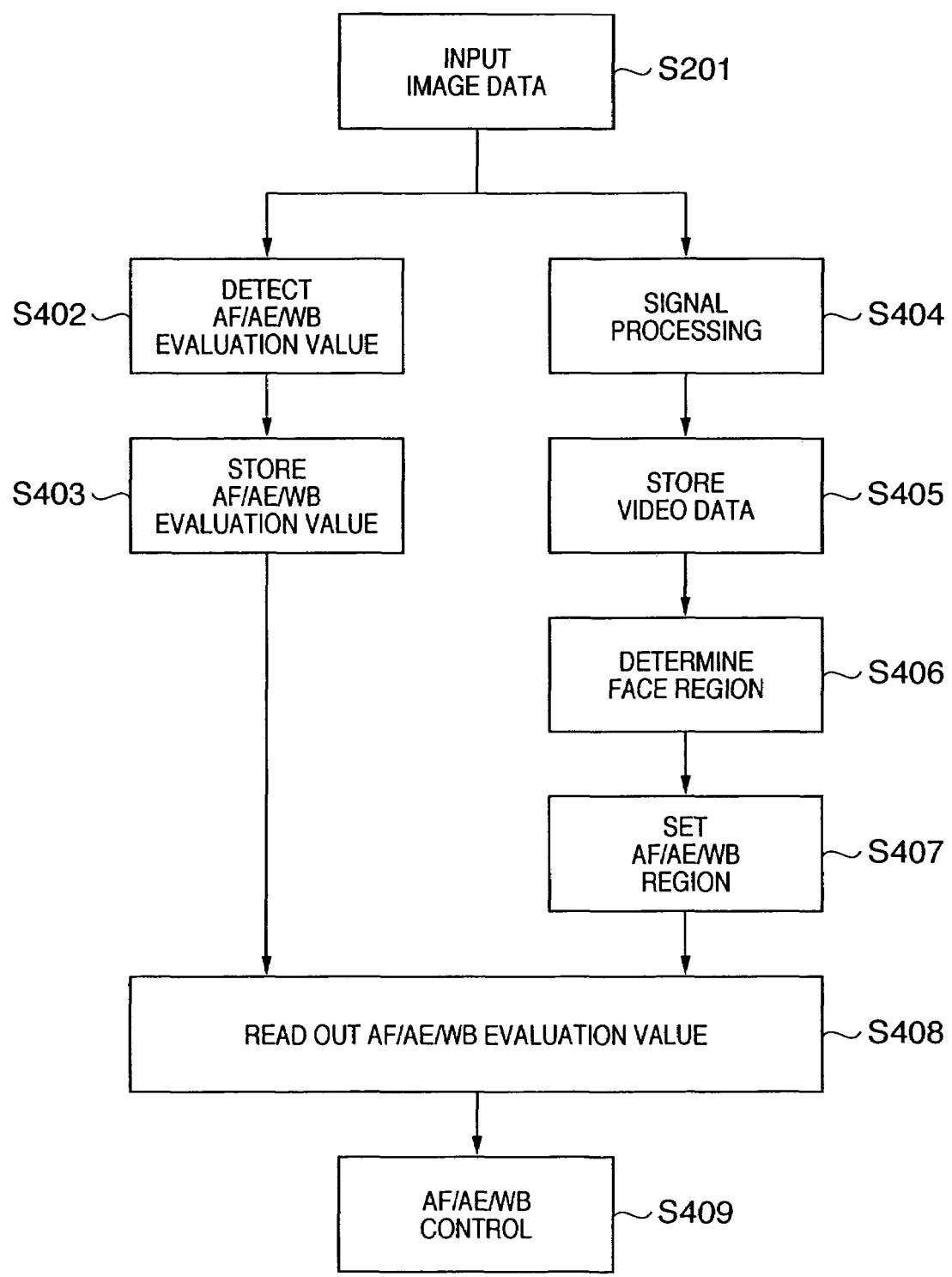
FIG. 14 is a flowchart showing processing according to the fourth embodiment of the present invention.

The operation of the image capturing apparatus according to the fourth embodiment of the present invention will be explained with reference to the flowchart shown in FIG. 14

A digital still camera monitors an image to be captured on the display unit 19 before image capturing. In the fourth embodiment, the position of a man's face and an AF/AE/WB evaluation value are extracted during monitoring.

In step S401, upon setting a face detection mode for detecting a face for the monitored image, light incident on the imaging optical unit 10 is formed into an image on the light-receiving surface of the image sensing element 11, and output as an analog image signal from the image sensing element 11. The analog image signal is converted into digital image data by the A/D conversion circuit 12, and the digital image data is input to a signal processor 13 and AF/AE/WB detector 17. Note that, in this case, the signal input is started to the signal processor 13 by setting the face detection mode. However, the signal input may be started to the signal processor 13 by pressing a release button halfway (SW1).

In step S402, the AF/AE/WB detector executes detection of the AF/AE/WB evaluation value from image data which is input as needed.

In step S403, the CPU 18 stores the integral value of the AF/AE/WB evaluation value in a predetermined memory space (memory space A) in a memory 15 via a memory I/F 14.

At this time, the entire frame is segmented into, e.g., 16 (horizontal)×16 (vertical)=256 blocks, and the integral value of the AF/AE/WB evaluation value in each block is stored in the memory 15. The data amount stored in the memory 15 can be reduced in comparison with the third embodiment in which the data compressed by the RAW compression scheme is stored in the memory 15. The AF evaluation value is obtained by causing image data to pass through a high-pass filter or bandpass filter, and contains only frequency components of a specific range. The frequency of the AF evaluation value is converted into a low-frequency component and decimated (data decimation) to reduce the data amount stored in the memory 15.

In step S404, input image data undergoes gamma processing, interpolation processing, matrix conversion, and the like to create video data by the signal processor 13.

In step S405, the CPU 18 stores the video data created in step S404 via the memory I/F 14 in a predetermined memory space (memory space B) of the memory 15 that is different from the memory space A. The image data stored in step S403 and the video data created in the step S404 are based on the same image data output from the A/D conversion circuit 12.

In step S406, the face region determination unit 16 detects the region of a man's face by using the video data of the first frame obtained after setting the face detection mode, which is stored in the memory space B in step S405. As a method of detecting the region of a man's face, a method using an eigenface by the analysis of a main component (M. A. Turk and A. P. Pentland, "Face recognition using eigenfaces", Proc. of IEEE Conf. on Computer Vision and Pattern Recognition, pp. 586-591, 1991.), and a method utilizing a feature point such as an eye, nose, or mouth (in Japanese Patent Laid-Open No. 09-251534) are proposed and applicable. According to these methods, whether an input image is an image of a man's face is determined by pattern matching between the input image and a plurality of standard patterns.

In the fourth embodiment, pattern matching is executed between the standard pattern of a man's face that is stored in advance in a memory space C of the memory 15 and the video data of the first frame obtained after setting the face detection mode, which is stored in the memory space B in step S405. While pattern matching is executed, the display unit 19 displays, as needed, new video data following the first frame obtained after setting the face detection mode, such that the user can monitor the object.

In step S407, the CPU 18 sets a region (AF region) for detecting an AF (Auto Focus) evaluation value, and a region (AE region) for detecting an AE (Auto Exposure) evaluation value on the basis of information on the man's face region detected in step S406. If it is determined in step S406 that no man's face exists, an AF/AE/WB region is set by a general method.

In step S107, the CPU 18 selects the latest image data in which a change amount with respect to the image of frame 1 serving as a face region detection target falls within a predetermined value, from image data in a frame 1 period and subsequent period stored in the memory space A in step S403. Of AF/AE/WB evaluation values of these selected image data, the AF/AE evaluation value of a region (one or a plurality of blocks among the 256 divided blocks described above) contained in the AF/AE region set in step S407 is read out.

In step S409, the CPU 18 obtains an AF/AE/WB adjustment amount, and controls the imaging optical unit 10. Also, the CPU 18 sets the parameters of signal processing in the signal processor 13 on the basis of the AE evaluation value detected in step S408.

As described above, during monitoring of a digital still camera, frame images are successively output from the A/D conversion circuit 12. Thus, the next frame image is input to the signal processor 13 and the AF/AE/WB detector 17 even while processes in steps S406 to S409 are executed. In order to detect the AF/AE/WB evaluation value on the basis of the captured image in which the change amount with respect to the image of frame 1 as a face region detection target falls within a predetermined value, the memory space is switched for each frame to perform processes in steps S402 to S408. This state will be explained with reference to the timing chart of FIG. 15 and the memory space views of FIGS. 16A to 16C.

Frame images are numbered from frame 1, frame 2, frame 3, . . . in the order of input to the signal processor 13 and the AF/AE/WB detector 17. A period during which image data of frame 1 is input is defined as a frame 1 period, and a frame 2 period, frame 3 period, . . . are similarly defined. Assume that, in this state, the position of the man's face is detected for a period of ten frames.

Figure 15:
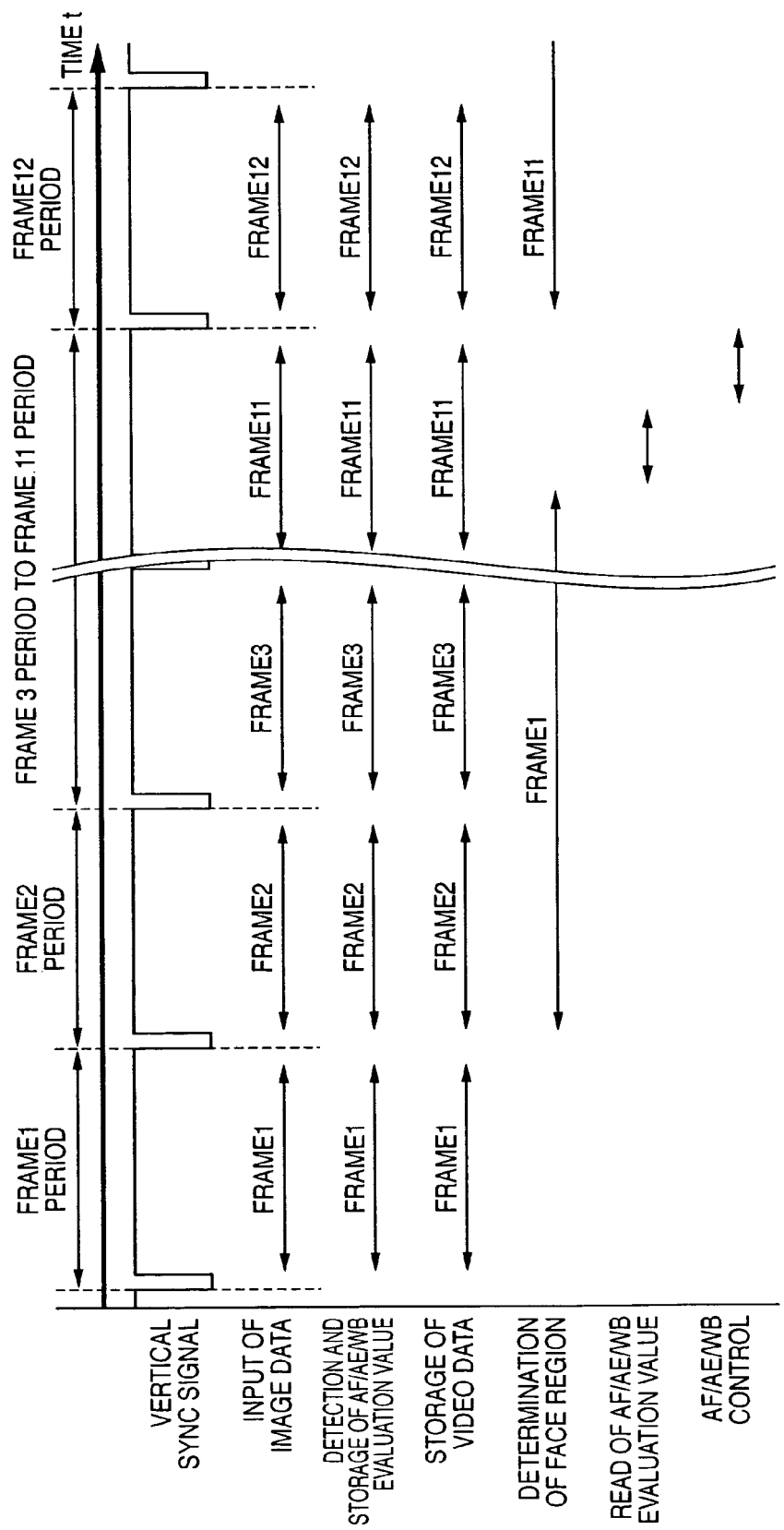
FIG. 15 is a timing chart according to the fourth embodiment of the present invention.

The timing chart of FIG. 15 shows timings at which processes in steps S401 to S409 are done, and frame numbers processed in the respective steps in the frame 1 period to frame 12 period which are delimited by vertical sync signals. In FIG. 15, input of image data corresponds to step S401; detection and storage of the AR/AE/WB evaluation value, to steps S402 and S403; storage of video data, to step S405; determination of the face region, to step S406; detection of the AF/AE/WB evaluation value, to step S408; and AF/AE/WB control, to step S409.

(1) Frame 1 Period

For image data of frame 1, the AF/AE/WB detector 17 and the signal processor 13 respectively parallel-execute processes in steps S402 and S403 and a process in step S405. The AF/AE/WB evaluation value and video data of frame 1 are respectively stored in the memory spaces A and B. FIG. 10A shows an example of the memory space of the frame 1 period. The memory space C is assumed to store in advance the standard pattern of a face that is used to determine a face region.

(2) Frame 2 Period to Frame 11 Period

In determination of the face region in step S406, video data of frame 1 stored in the memory space B is read out, and the face region is determined by pattern matching with the standard pattern stored in the memory space C. Also, in a frame 2 period to frame 11 period, the image data output from the A/D conversion circuit 12 is continuously input to the signal processor 13, and the display unit 19 performs a display operation by using the video data based on the image data obtained in the frame 2 period to frame 11 period. However, determination of the face region is performed for the video data of frame 1 stored in the memory space B. The same processing as that in the frame 1 period is executed for image data of frames 2 to 11, and AF/AE/WB evaluation value of frames 2 to 11 are sequentially stored in a memory space different from the memory space A, and video data is also sequentially stored in a memory space different from the memory space B. FIG. 16B shows an example of the memory space after completion of the frame 11 period. The AF/AE/WB evaluation value of frame 11 is stored in a memory space A', and the video data of frame 11 is stored in a memory space B' in FIG. 16B.

In step S407, the CPU 18 calculates the correlation between the image of frame 1 serving as a face region detection target recorded in step S406, and the images of frames 2 to 11. On the basis of the calculated correlation value, the CPU 18 determines whether the change amount between the frames falls within a tolerance. If the change amount falls within the tolerance, it is determined that a scene is not changed. The CPU 18 thus sets the AF/AE/WB region for the data of the latest frame in which the change amount falls within the tolerance.

In step S408, the AF/AE/WB detector 17 reads out, from the memory 15, the AF/AE/WB evaluation value in the region of a frame corresponding to a frame set in the AF/AE/WB region in step S407. Note that since the AF evaluation value cannot be calculated from the image of one frame, the evaluation value is detected in consideration of some frames with reference to the frame set in the AF/AE/WB region in step S407. Note that if detection of the evaluation value is complete, the CPU 18 erases the stored data of frames 1 to 11.

In step S409, the CPU 18 performs AF/AE/WB control on the basis of the evaluation value read out in step S408.

Alternatively, the same processing as that in the frame 1 period is executed for image data of frame 2. The AF/AE/WB evaluation value of frame 2 is stored in a memory space A' different from the memory space A, and video data is stored in a memory space B' different from the memory space B. FIG. 16B shows an example of the memory space in the frame 2 period.

For example, when images shown in FIGS. 6A and 6B are captured as the captured images of frames 1 and 11, the AF/AE/WB evaluation value and video data in FIG. 6A are stored in the memory 15 in the frame 1 period, and the AF/AE/WB evaluation value and video data in FIG. 6B are stored in the frame 11 period. The result of detecting a face position from the video data in FIG. 6A is an x region surrounded by a dotted line. AF/AE/WB control is executed by reading out, from the memory 15, an AF/AE/WB evaluation value obtained from the x region in FIG. 6A.

(3) Frame 12 Period and Subsequent Period

In the frame 12 period and subsequent period, the same processing as that in the frame 2 period to frame 11 period is executed, and the write/read memory space in the memory 15 is alternately switched for each frame. In the frame 3 period, write in the memory 15 is done in the memory spaces A and B in steps S403 and S405, and read from the memory 15 is done in the memory spaces B' and A' in step S406. FIG. 10C shows an example of the memory space in the frame 12 period.

(4) Still Image Capturing

By storing an AE evaluation value obtained during monitoring in the memory 15, the AE evaluation value can be used to set the parameters of gamma processing, interpolation processing, matrix conversion, and the like in the signal processor 13 also in still image capturing following monitoring.

Note that, in the fourth embodiment, as in the first embodiment, the AF/AE/WB region is set for the image of the last frame in which the scene change amount falls within the tolerance. However, any other images may be used for setting the region as long as the scene change amount falls within the tolerance in the image of the frame.

Also, the AF/AE/WB region may be set for the image of the (high-evaluation) frame in which the scene change amount is smallest in the images of frames in which the scene change amounts fall within the tolerance.

Also, when no image of the frame in which the scene change amount falls within the tolerance exists, for example, general evaluation/photometry processing is performed, the AF/AE/WB region is set, and the AF/AE/WB control is performed.

As described above, in the fourth embodiment, the AF/AE/WB evaluation value can be detected on the basis of the captured image in which the change amount with respect to the image of the frame serving as the face region detection target falls within the predetermined value. Hence, focus adjustment and exposure control to the man's face can be performed at a higher precision than the conventional one, and is resistant to movement of the man and camera shake.

Also, the AF/AE/WB evaluation value can be detected on the basis of the data of the frame which is the latest in a temporal order. Hence, even if a composition itself is not changed, exposure control can be performed at a high precision even when brightness or the like in an entire scene changes in accordance with temporal variation.

Other Embodiment

The object of the embodiments is also achieved when a storage medium (or recording medium) which stores software program codes for realizing the functions of the above-described embodiments is supplied to a system or apparatus, and the computer (or the CPU or MPU) of the system or apparatus reads out and executes the program codes stored in the storage medium. In this case, the program codes read out from the storage medium realize the functions of the above-described embodiments, and the storage medium which stores the program codes constitutes the present invention. The functions of the above-described embodiments are realized when the computer executes the readout program codes. Also, the functions of the above-described embodiments are realized when an OS (Operating System) or the like running on the computer performs some or all of actual processes on the basis of the instructions of the program codes.

Furthermore, the present invention includes a case in which, after the program codes read out from the storage medium are written in the memory of a function expansion card inserted into the computer or the memory of a function expansion unit connected to the computer, the CPU of the function expansion card or function expansion unit performs some or all of actual processes on the basis of the instructions of the program codes and thereby realizes the functions of the above-described embodiments.

When the present invention is applied to the storage medium, the storage medium stores program codes corresponding to the above-described flowcharts.

As described in the above embodiment, an AF/AE/WB evaluation value based on a captured image in which a change amount with respect to an image of a frame serving as a face region detection target falls within a predetermined value can be detected, thereby performing focus adjustment and exposure control to the man's face at a higher precision than the conventional one, and is resistant to movement of a man and camera shake.

As many apparently widely different embodiments of the present invention can be made without departing from the spirit and scope thereof, it is to be understood that the invention is not limited to the specific embodiments thereof except as defined in the appended claims.

CLAIM OF PRIORITY

This application claims priority from Japanese Patent Application No. 2004-109071 filed on Apr. 1, 2004 and Japanese Patent Application No. 2005-093874 filed on Mar. 29, 2005, which are incorporated by reference herein.

What is claimed is:

1. An image capturing apparatus comprising:
an image sensing element that photoelectrically converts an object image formed by an imaging optical system, and outputting an image signal;
an A/D conversion element that digitizes the image signal output from said image sensing element, and outputting a plurality of frames of first image data;
an extraction element that divides the first image data into a plurality of areas and extracts an evaluation value for at least one of auto focus, auto exposure, and white balance from each divided area of the first image data;
a storage element that stores evaluation values each of which is extracted from the each divided area by said extraction element;
a face detection element that detects a face region from second image data which is formed from the first image data;
a display element that displays an image on the basis of the first image data; and
a control element that reads out the evaluation value stored in said storage element and performs at least one of auto focus control, auto exposure control, and white balance control,
wherein the second image data is generated from a specific frame of the plurality of frames of first image data,
wherein said display element displays the image on the basis of the plurality of frames of first image data that are output after the specific frame, while said face detection element detects the face region from the second image data, and
wherein said control element reads out the evaluation value corresponding to the detected face region from said storage element, the evaluation value having been extracted from the specific frame of first image data and stored in said storage element, and performs at least one of auto focus control, auto exposure control, and white balance control on the basis of the read out evaluation value corresponding to the detected face region, after said face detection element completely detects the face region from the second image data.

2. An image capturing apparatus control method comprising:
an image sensing step of photoelectrically converting an object image formed by an imaging optical system, and outputting an image signal;
an A/D conversion step of digitizing the image signal output in the image sensing step, and outputting a plurality of frames of first image data;
an extraction step of dividing the first image data into a plurality of areas and extracting an evaluation value for at least one of auto focus, auto exposure, and white balance from each divided area of the first image data;
a storage step of storing evaluation values each of which is extracted from the each divided area in the extraction step in a storage element;
a face detection step of detecting a face region from second image data which is formed from the first image data;
a display step of displaying an image on the basis of the first image data; and
a control step of reading out the evaluation value stored in said storage step and performing at least one of auto focus control, auto exposure control, and white balance control,
wherein the second image data is generated from a specific frame of the plurality of frames of first image data,
wherein in said display step, the image is displayed on the basis of the plurality of frames of first image data that are output after the specific frame, while the face region is detected from the second image data in said face detection step, and wherein in said control step, the evaluation value corresponding to the detected face region is read out from the storage element, the evaluation value having been extracted from the specific frame of first image data and stored in the storage element, and at least one of auto focus control, auto exposure control, and white balance control is performed on the basis of the read out evaluation value corresponding to the detected face region, after the face region is completely detected from the second image data in said face detection step.

* * * * *